United States Patent [19]

Iwashita

[11] Patent Number: 5,673,425
[45] Date of Patent: Sep. 30, 1997

[54] SYSTEM FOR AUTOMATIC GENERATING INSTRUCTION STRING TO VERIFY PIPELINE OPERATIONS OF A PROCESSOR BY INPUTTING SPECIFICATION INFORMATION HAVING TIME FOR THE PROCESSOR TO ACCESS HARDWARE RESOURCES

[75] Inventor: Hiroaki Iwashita, Kawasaki, Japan

[73] Assignee: Fujitsu Limited, Kawasaki, Japan

[21] Appl. No.: 698,755

[22] Filed: Aug. 16, 1996

Related U.S. Application Data

[63] Continuation of Ser. No. 299,296, Sep. 1, 1994, abandoned.

[30] Foreign Application Priority Data

Sep. 1, 1993 [JP] Japan .................. 5-217813

[51] Int. Cl.$^6$ .................. G06F 11/263
[52] U.S. Cl. .................. 395/568; 395/183.06; 395/800; 395/183.01
[58] Field of Search .................. 395/800, 392, 395/395, 568, 557, 559, 375, 704, 183.01, 183.06, 183.13, 183.14, 183.21, 183.22, 184.01, 185.04

[56] References Cited

U.S. PATENT DOCUMENTS

| | | | |
|---|---|---|---|
| 4,253,183 | 2/1981 | Taylor et al. | 371/16.1 |
| 4,769,817 | 9/1988 | Krohn et al. | 371/23 |
| 4,862,399 | 8/1989 | Freeman | 364/580 |
| 4,982,402 | 1/1991 | Beaveu et al. | 371/12 |
| 4,984,239 | 1/1991 | Suzuki et al. | 371/3 |
| 5,109,381 | 4/1992 | Duxbury et al. | 371/16.5 |
| 5,111,458 | 5/1992 | Hara | 371/16.5 |
| 5,390,323 | 2/1995 | Newell et al. | 395/575 |
| 5,410,686 | 4/1995 | Kish | 395/575 |
| 5,475,695 | 12/1995 | Caywood et al. | 371/21 |

OTHER PUBLICATIONS

"Test Plan Generation and Concurrent Scheduling of Test in the Presence of Conflicts"; T. C. Wilson et al; IEEE 1991.
"Issues in Fault Modelling and Testing of Micropipelines"; Sandeep Pagey et al; IEEE 1992.
"Behavioral Design and Test Assistance for Pipelined Processors"; Hiroaki Iwashita et al IEEE, Jan/92, pp. 8–13.
"Functional Test Generation for Pipelined Computer Implementations"; David C. Lee et al, IEEE Jan. 1991, pp. 60–67.
"Systematic Validation of Pipeline Interlock for Superscalar Microarchitectures"; Trung A. Diep et al; IEEE Jan. 1995, pp. 100–109.
"Automatic Program Generator for Simulation-Based Processor Verification"; Hiroaki Iwashita et al. IEEE Jan. 1994, pp. 298–303.

*Primary Examiner*—Meng-Ai T. An
*Attorney, Agent, or Firm*—Staas & Halsey

[57] ABSTRACT

Specification information is input about a pipeline process of a plurality of instructions to be executed by a pipeline processor. Each pipeline stage of the instructions can have a different configuration, and the processor can have a plurality of similar pipeline stages. The pipeline has a plurality of pipeline stages each having a different clock number. When the specification information is entered, listed are a plurality of states in which hazards are caused among a plurality of instructions executed by the processor. An instruction string is generated corresponding to each of the listed states. Thus, the operation of the pipeline control mechanism can be verified with high reliability for various processors such as a processor which supports an instruction having different pipeline stage configurations, a processor provided with a plurality of similar pipeline stages, etc.

35 Claims, 38 Drawing Sheets

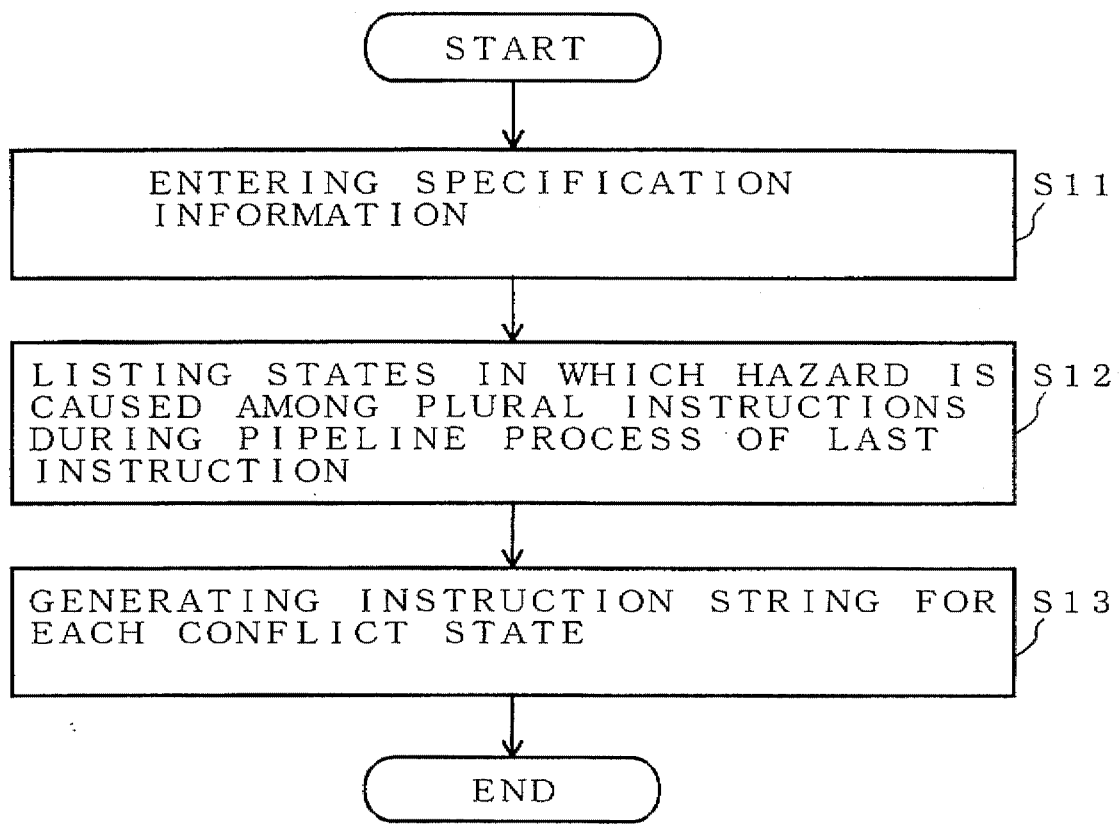
F I G. 3

| INSTRUC-TION | TIME | | | | | | |
|---|---|---|---|---|---|---|---|
| | 1 | 2 | 3 | 4 | 5 | 6 | 7 |
| NOP | IF | ID | | | | | |
| ADD | IF | ID GPR/R | IU | WB GPR/W | | | |
| LOAD | IF | ID GPR/R | IU | MEM | WB GPR/W | | |
| FADD | IF | ID GPR/R | FPU | FPU | WB GPR/W | | |
| FMUL | IF | ID GPR/R | FPU | FPU | FPU | FPU | WB GPR/W |

| NUMBER | INSTRUCTION | TIME 1 2 3 4 5 6 7 8 9 10 |
|---|---|---|
| 6 | FMUL / FMUL / * / FMUL | |
| 7 | FMUL / * / FADD / FADD | |
| 8 | FMUL / * / FADD / FMUL | |
| 9 | FMUL / * / FMUL / FADD | |
| 10 | FMUL / * / FMUL / FMUL | |

FIG. 13B

| NUMBER | INSTRUC-TION | TIME | | | | | | | | | |
|---|---|---|---|---|---|---|---|---|---|---|---|
| | | 1 | 2 | 3 | 4 | 5 | 6 | 7 | 8 | 9 | 10 |
| 1 | LOAD | IF | ID GPR/R | IU | MEM | WB GPR/W | | | | | |
| | ADD | | IF | ID GPR/R | IU | WB GPR/W | | | | | |
| 2 | FADD | IF | ID GPR/R | FPU | FPU | WB GPR/W | | | | | |
| | ADD | | IF | ID GPR/R | IU | WB GPR/W | | | | | |
| 3 | FMUL | IF | ID GPR/R | FPU | FPU | FPU | FPU | MB GPR/W | | | |
| | * | | | | | | | | | | |
| | LOAD | | | IF | ID GPR/R | IU | MEM | WB GPR/W | | | |
| 4 | FMUL | IF | ID GPR/R | FPU | FPU | FPU | FPU | WB GPR/W | | | |
| | * | | | | | | | | | | |
| | FADD | | | IF | ID GPR/R | FPU | FPU | WB GPR/W | | | |
| 5 | FMUL | IF | ID GPR/R | FPU | FPU | FPU | FPU | WB GPR/W | | | |
| | * | | | | | | | | | | |
| | * | | | | | | | | | | |
| | ADD | | | | IF | ID GPR/R | IU | WB GPR/W | | | |

FIG. 14

| NUMBER | INSTRUC-TION | TIME 1 2 3 4 5 6 7 8 9 10 |
|---|---|---|
| 1 | ADD | IF \| ID GPR/R \| IU \| WB GPR/W |
| | ADD | IF \| ID GPR/R \| IU \| WB GPR/W |
| 2 | ADD | IF \| ID GPR/R \| IU \| WB GPR/W |
| | * | |
| | ADD | IF \| ID GPR/R \| IU \| WB GPR/W |

FIG. 15

| NUMBER | INSTRUC-TION | TIME 1 2 3 4 5 6 7 8 9 10 |
|---|---|---|
| 1 | FMUL<br>LOAD | IF / ID GPR/R / FPU / FPU / FPU / FPU / WB GPR/W<br>　　IF / ID GPR/R / IU / MEM / WB GPR/W |
| 2 | FMUL<br>*<br>LOAD | IF / ID GPR/R / FPU / FPU / FPU / FPU / WB GPR/W<br><br>　　　　IF / ID GPR/R / IU / MEM / WB GPR/W |

FIG. 16

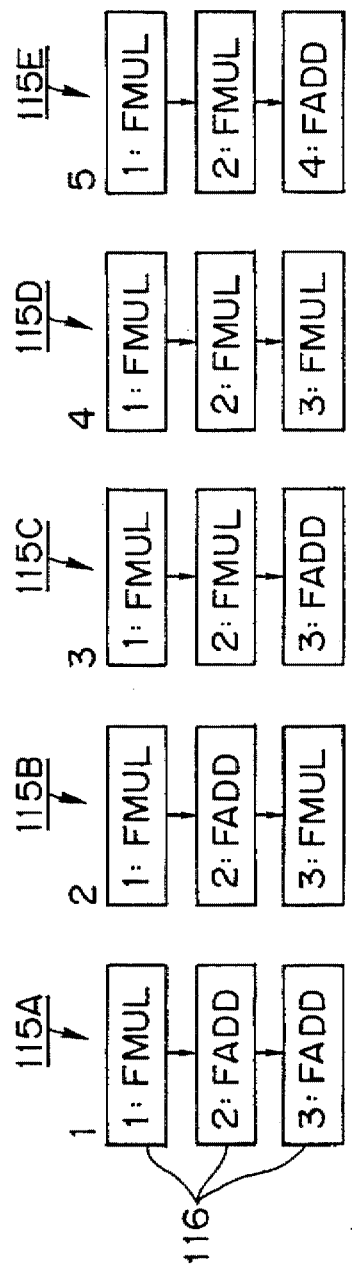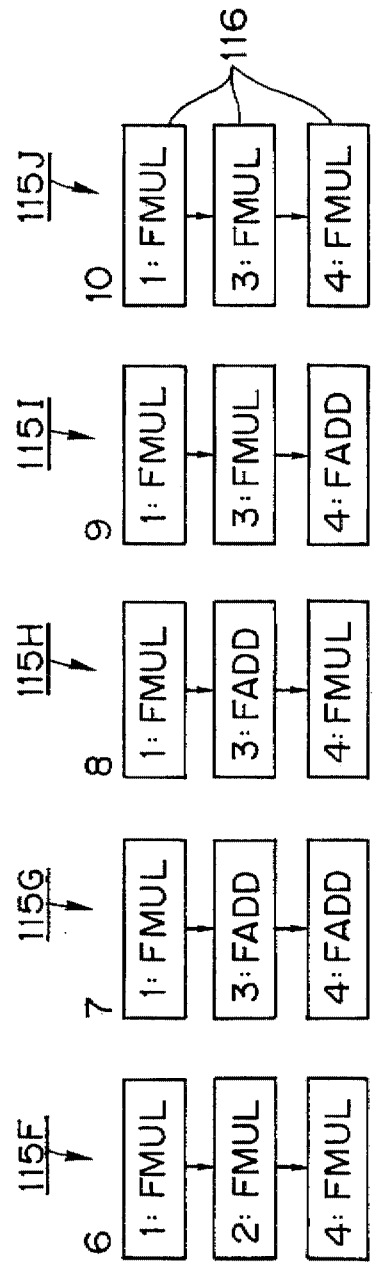

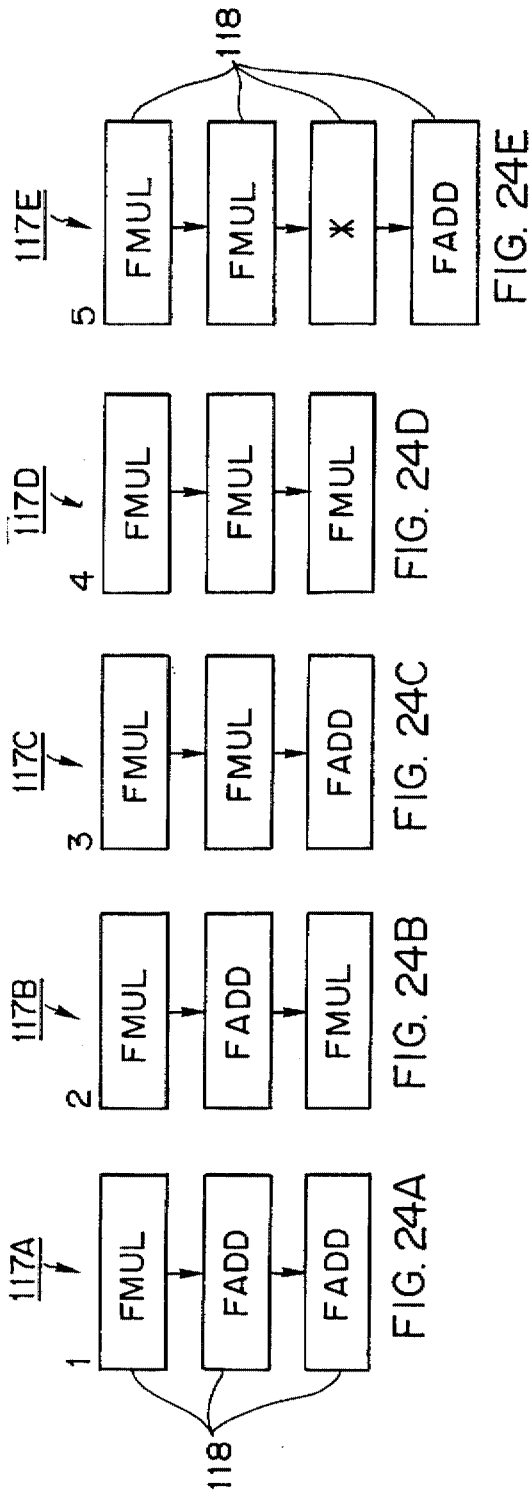
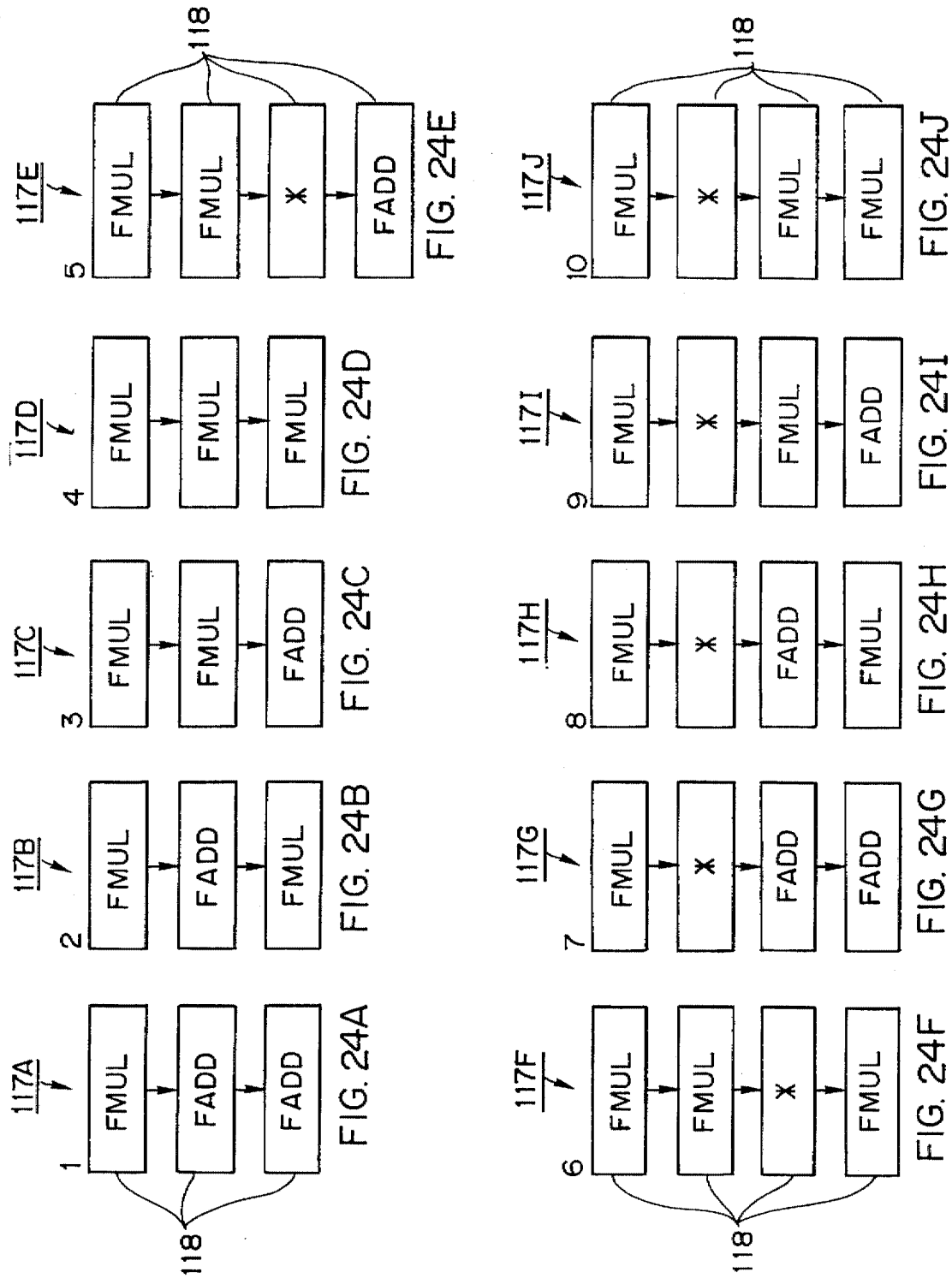

| INSTRUC-TION | TIME | | | | | | | |
|---|---|---|---|---|---|---|---|---|
| | 1 | 2 | 3 | 4 | 5 | 6 | 7 | 8 |
| FMUL | IF | ID GPR/R | FPU | FPU | FPU | FPU | WB GPR/W | |
| * | | | | | | | | |
| LOAD | | IF | ID GPR/R | IU | MEM | | WB GPR/W | |

FIG. 29A

| INSTRUC-TION | TIME | | | | | | | |
|---|---|---|---|---|---|---|---|---|
| | 1 | 2 | 3 | 4 | 5 | 6 | 7 | 8 |
| FMUL * LOAD | IF | ID GPR/R | IF FPU | ID FPU GPR/R | IU FPU | MEM FPU | WB GPR/W | WB GPR/W |

FIG. 29B

| NUMBER | INSTRUC-TION | TIME |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| 1 | FMUL * LOAD | IF | ID GPR/R | IF FPU | ID FPU GPR/R | IU FPU | MEM FPU | WB GPR/W | WB GPR/W |  |  |
|  | LOAD |  |  |  | IF | ID GPR/R | IU | MEM | WB GPR/W |  |  |
| 2 | FMUL * LOAD | IF | ID GPR/R | IF FPU | ID FPU GPR/R | IU FPU | MEM FPU | WB GPR/W | WB GPR/W |  |  |
|  | FADD |  |  |  | IF | ID GPR/R | FPU | FPU | WB GPR/W |  |  |
| 3 | FMUL * LOAD * ADD | IF | ID GPR/R | IF FPU | ID FPU GPR/R | IU FPU | MEM FPU | WB GPR/W | WB GPR/W |  |  |
|  |  |  |  |  | IF | ID GPR/R | IU | WB GPR/W |  |  |  |

FIG. 30

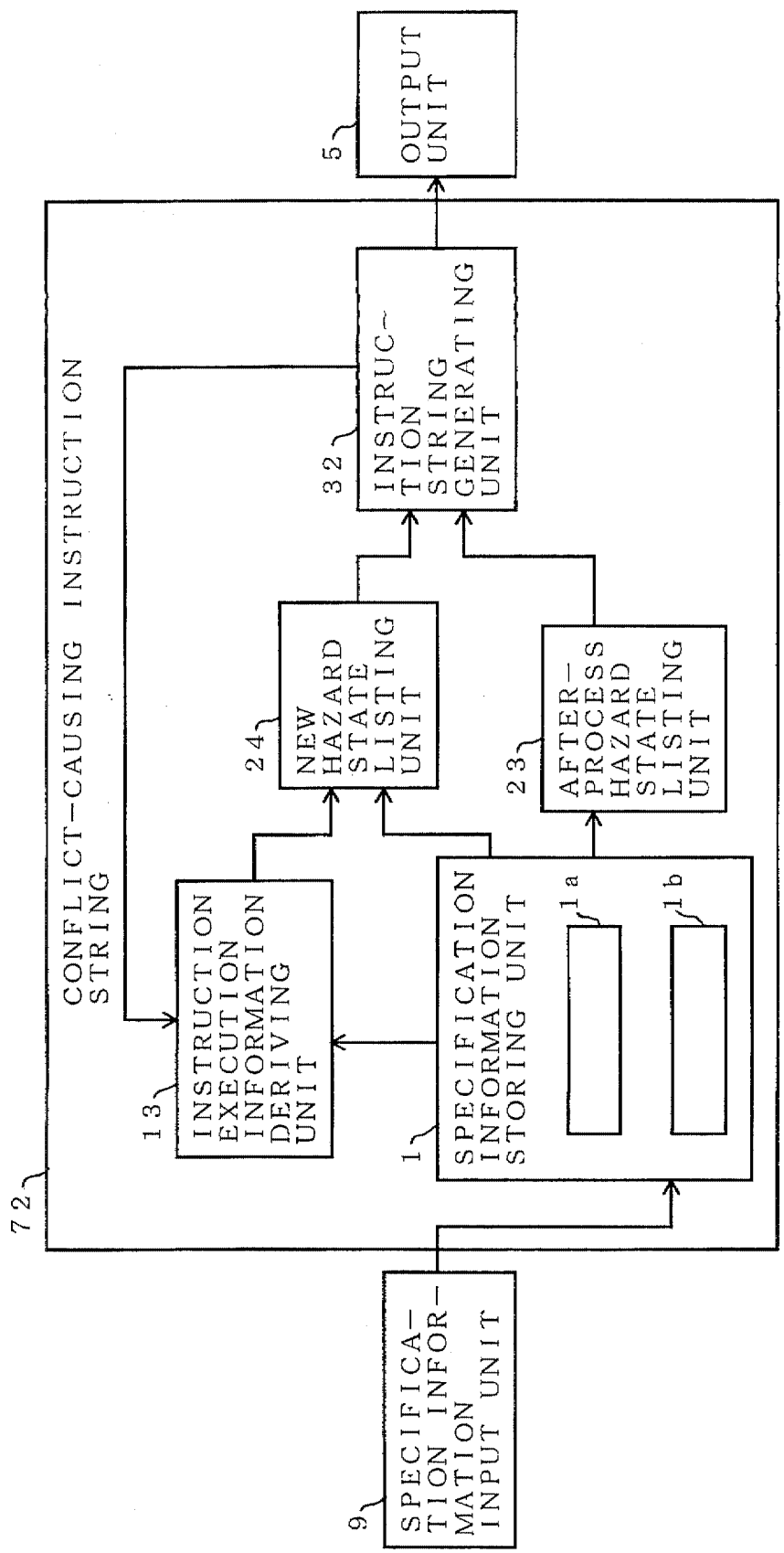
F I G. 34

SYSTEM FOR AUTOMATIC GENERATING INSTRUCTION STRING TO VERIFY PIPELINE OPERATIONS OF A PROCESSOR BY INPUTTING SPECIFICATION INFORMATION HAVING TIME FOR THE PROCESSOR TO ACCESS HARDWARE RESOURCES

This application is a continuation of application No. 08/299,296, filed Sep. 1, 1994, now abandoned.

BACKGROUND OF THE INVENTION

1. Field of the Invention

The present invention relates to an automatic instruction string generation method and device in which an instruction string is used in determining whether or not the operations of a pipeline control mechanism are performed in accordance with design specification.

2. Description of the Related Art

A logic simulation and an operation test are required in a production of a processor. The logic simulation is performed in checking whether or not specification descriptions are correctly realized, while the operation test is conducted in checking whether or not a produced processor operates to satisfy the specification.

The logic simulation and the operation test are conducted by having a processor execute a test program. Accordingly, producing the test program is indispensable. An especially high-quality test program is required to realize a highly reliable verification.

Recently, processing an instruction in a pipeline process of a processor is a basic technology for a high-speed processor process. In an instruction pipeline process, a single instruction process is divided into a plurality of small process units named "pipeline stages". Each of the pipeline stages is operated in parallel to process a plurality of instructions overlapping one another.

A CPI (clock cycles per instruction) indicates the number of clock cycles required to execute an instruction, and is used to evaluate the performance of a processor.

In an ideal pipeline process, a single instruction is processed in one clock cycle (CPI=1). However, there often arises a condition which disturbs an ideal flow of instructions. Such an undesirable condition is referred to as a hazard. There are the following three types of hazards.

1. Structured hazard: In a pipeline stage, a structured hazard is caused by a conflict for hardware resources when a plurality of instructions are to use the same hardware resources. For example, a structured hazard occurs if N hardware resources are provided and there are more than N instructions to access the resources.

2. Data hazard: A data hazard is caused depending on the sequence of read/write of data stored in a memory, register, etc., that is, data dependence. There are the following three cases of data dependence, that is, a flow dependence, an anti-dependence, and an output dependence. A RAW (read after write) hazard is associated with the flow dependence. A WAR (write after read) hazard is associated with the anti dependence. A WAW (write after write) hazard is associated with the output dependence.

3. Control hazard: A control hazard is caused when a pipeline process is performed on an instruction, for example, a branch instruction, etc. to change a value of a program counter.

To prevent these hazards, a processor is internally provided with a function (pipeline interlocking function) of temporarily stopping the execution of an instruction by inserting a stall cycle, or a control mechanism of rearranging the sequence of instructions to be executed.

A processor generally comprises an operating unit (an ALU, a register file, etc.) for actually processing data and a control unit for controlling the operating unit. The function of the latter is more complicated than that of the former. Especially, the control unit (a pipeline control mechanism) of a processor with the above described pipeline processing system is required to provide an advanced function of detecting and clearing a hazard when the processor is operated.

Therefore, it is very important, but very difficult, to generate a test program for efficiently checking whether or not the pipeline control mechanism correctly works to satisfy the above described functions when the operation of the processor is verified.

Conventionally, the above mentioned test program has been generated by the following methods.

1. A test program is generated manually.

2. A number of instructions are generated at random by a computer as an instruction string, and the instruction string is used as a test program.

3. An existing program is used as a test program.

However, these methods show the following problems.

Method 1 takes a long time to develop a program because it is generated manually. Additionally, it is impossible to generate an instruction string through which all hazard causing conditions can be checked. Therefore, the quality of the check can hardly be evaluated, because it is not proved that the check is effective and complete.

Methods 2 and 3 improve the reliability of verification by increasing the number of instructions. However, it takes an enormously long time to perform a logic simulation when a processor is designed or to conduct an operation test of a processor after it is produced.

SUMMARY OF THE INVENTION

An object of the present invention is to automatically generate an instruction string through which an operation of a high-quality pipeline control mechanism can be verified. The verification is performed to shorten the time taken for the development of the pipeline control mechanism of a processor.

Another object of the present invention is to automatically generate an instruction string through which the operation of the pipeline control mechanism can be verified in a shorter time. The instruction string is used in a logic simulation performed in the development of the pipeline control mechanism and used in an operation test conducted on a processor.

A further object of the present invention is to automatically generate an instruction string through which an operation of a pipeline control mechanism can be verified for various types of processors provided with pipelines containing a pipeline stage whose number of clocks required to complete a process is different from that of other pipeline stages, pipelines containing a plurality of identical pipelines for simultaneous use, pipelines in which an instruction takes a different pipeline stage depending on its type, and pipelines in a super-scalar method in which a plurality of instructions can be simultaneously fetched.

Thus, according to the present invention, first entered is specification information associated with a pipeline process of instructions to be executed by a processor operated in a pipeline method. The specification information refers to pipeline process information indicating the time taken by the processor to occupy hardware resources when it processes each instruction at each pipeline stage in the pipeline process, or the time taken to write and read data to and from a register, a memory, etc.

Described below is a hazard which arises among a plurality of instructions when the processor performs a pipeline process according to the above described specification information.

The instruction string is generated as being related to the occurrence of the hazard.

The occurrence of a hazard is described such that N+1 instructions, which use the hardware resources, are selected when N hardware resources are simultaneously available in a pipeline, and the instructions are rearranged in execution sequence with a start time shifted by one clock cycle and with each previous pipeline process information overlapping present information.

Thus, an instruction string for use in verifying the operation of a pipeline control mechanism can be automatically generated. All instruction strings that incur a hazard can also be automatically generated. Additionally, a hazard-causing instruction string is automatically generated if there are a plurality of hardware resources simultaneously available in the pipeline process, and if the instruction string is composed of instructions each taking a different path in the pipeline.

Also described is the state of a hazard which has arisen between the last processed instruction and its preceding instructions after the instructions have been processed without a stop in a pipeline of the processor according to the specification information.

Thus, all instruction strings that generate a hazard can be automatically generated in addition to instruction strings applicable to various processors as described above.

BRIEF DESCRIPTION OF THE DRAWINGS

FIG. 3 shows the principle of the second method in which an instruction string is generated to verify the operation of the pipeline control mechanism according to the present invention;

FIG. 8 shows the specification of an instruction executed by the processor shown in FIG. 7;

FIGS. 13A and 13B show a state of a conflict among a plurality of instructions in which a structural hazard occurs due to a conflict for an FPU unit;

FIG. 14 shows a state of a conflict among a plurality of instructions in which a structural hazard occurs due to a conflict for a WB unit;

FIG. 15 shows a state of a conflict among a plurality of instructions in which a flow-dependent RAW hazard occurs in writing/reading data to or from a GPR;

FIG. 16 shows a state of a conflict among a plurality of instructions in which an output-dependent WAW hazard occurs in writing/reading data to or from a GPR;

FIGS. 23A, 23B, 23C, 23D, 23E, 23F, 23G, 23H, 23I and 23J show examples of data structures, which are generated by the conflict state listing unit in step S 106 in the flowchart shown in FIG. 17, indicating a state of a conflict among a plurality of instructions causing a structural hazard in an FPU unit;

FIGS. 24A, 24B, 24C, 24D, 24E, 24F, 24G, 24H, 24I and 24J show examples of data structures, which are generated by the instruction string generating unit 3 based on the data structures shown in FIGS. 23A, 23B, 23C, 23D, 23E, 23F, 23G, 23H, 23I and 23J, indicating an instruction string causing a structural hazard in an FPU unit;

FIGS. 29A and 29B show the information (instruction execution information) of a pipeline process of a hazard-causing instruction string provided with a pipeline interlock control generated by the instruction execution information deriving unit according to the third embodiment in response to a hazard-causing instruction string entered from the specification information conflict generating instruction string input unit;

FIG. 30 shows an example of a conflict state among a plurality of instructions causing a new structural hazard after the execution of the hazard-causing instruction string generated by the new conflict state listing unit according to the third embodiment based on the instruction execution information entered by the instruction execution information deriving unit and on the instruction specification information of the processor stored in the specification information storing unit;

FIG. 34 is a block diagram of the device for automatically generating an instruction string for verifying the operation of the pipeline control mechanism of the processor shown in FIG. 7 according to the fifth embodiment of the present invention;

DETAILED DESCRIPTION OF THE PREFERRED EMBODIMENTS

The preferred embodiments of the present invention are described below by referring to the attached drawings.

FIGS. 1 through 6 show the basic principles of the present invention.

Figure 1:
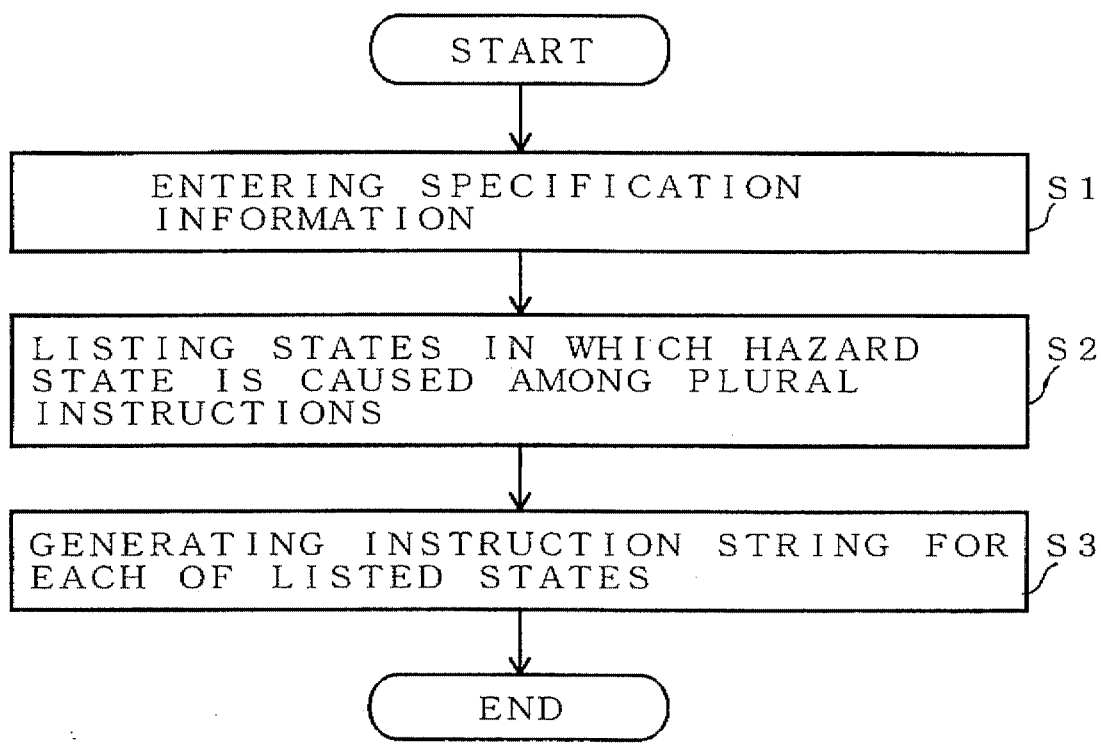
FIG. 1 shows the principle of the first method in which an instruction string is generated to verify the operation of the pipeline control mechanism according to the present invention.

FIG. 1 is the flowchart showing the first method of generating an instruction string for use in verifying the operation of the pipeline control mechanism of the processor which executes an instruction in a pipeline process.

In this method, first entered is specification information of each instruction executed by a processor (step S1). The specification information refers to the time taken by each instruction at each pipeline stage to occupy the hardware resources, and to the time taken to write/read data to and from hardware resources such as a register, memory, etc.

Listed below are the states in which a structural hazard and a data hazard are caused among a plurality of instructions (step S2).

Then, generated is an instruction string corresponding to each of the above listed states (step S3).

In a processor for supporting a dynamic hazard clearing method and performing a pipeline process as described above, the pipeline control mechanism detects a hazard state when a processor executes an instruction, and controls a pipeline interlock through which the pipeline is stalled until the hazard state can be cleared. The instruction string is used in checking whether or not the pipeline control mechanism is correctly performing the pipeline interlock control.

Figure 2:
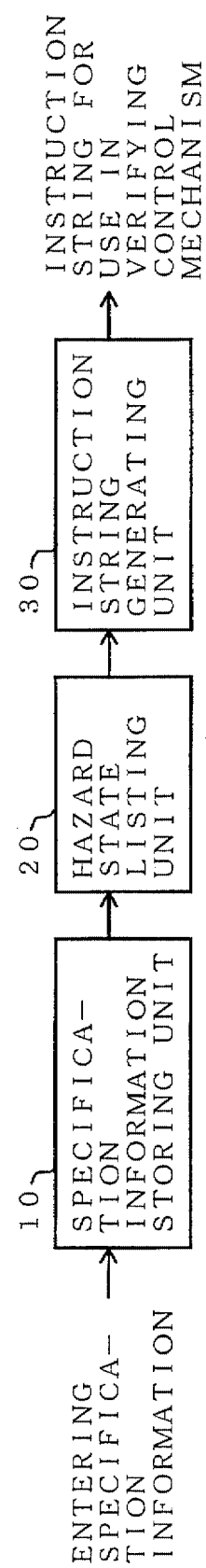
FIG. 2 is a block diagram of the device for generating the instruction string according to the above described first method.

FIG. 2 is the block diagram of the first device for generating an instruction string for use in verifying the operation of the pipeline control mechanism using the first method.

A specification information storing unit 10 receives and stores specification information of each instruction to be executed by the processor. A hazard state listing unit 20 receives the specification information from the specification information storing unit 10, and lists a state (pipeline process state) in which a hazard is generated among a plurality of instructions based on the information. An instruction string generating unit 30 receives the state from the hazard state listing unit 20. Then, it generates and outputs an instruction string corresponding to each of the states. The instruction string is used in verifying the operation of the pipeline control mechanism.

FIG. 3 is the flowchart showing the second method of generating an instruction string for use in verifying the operation of the pipeline control mechanism.

As in step S1 in the first method, entered is the specification information of each instruction executed by the processor (step S11).

Then, listed are states (pipeline process states) in which a structural hazard and a data hazard are generated among a plurality of instructions when the last instruction to be executed is processed in the pipeline process based on the specification information (step S12).

Then, an instruction string corresponding to each of the listed states is generated (step S 13). If the instruction string is executed by the processor, a pipeline process can be carried out smoothly without an insertion of a stall cycle until the execution of an instruction of the last step is started. A hazard is not generated before the execution of the instruction in the last step is started. Therefore, a basic operation of the pipeline control mechanism can be verified using the instruction string.

Figure 4:
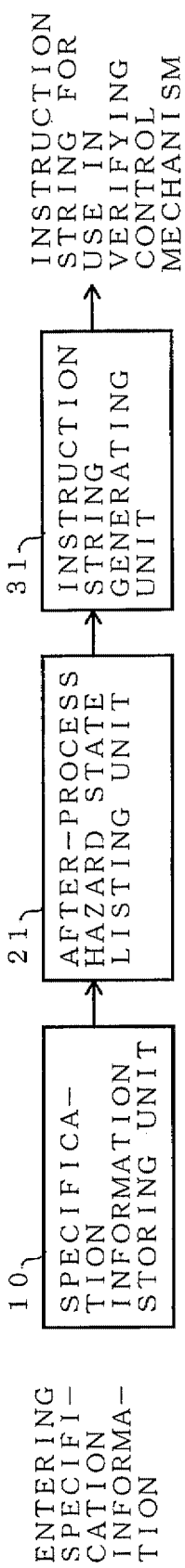
FIG. 4 is a block diagram of the device for generating the instruction string according to the above described second method.

FIG. 4 is the block diagram of the second device for generating by the above described second method an instruction string for use in verifying the operation of the pipeline control mechanism.

The specification information storing unit 10 receives and stores the specification information about an instruction executed by the processor. An after-process hazard state listing unit 21 receives the specification information from the specification information storing unit 10, and lists a state in which a hazard is caused among a plurality of instructions based on the information after the processor proceeds with the pipeline processes for a plurality of instructions without inserting any stall cycle. In this case, a hazard arises between the last instruction and the preceding instructions when the processor executes the last instruction.

An instruction string generating unit 31 receives the listed states from the hazard state listing unit 21, and generates and outputs an instruction string corresponding to each state.

Figure 5:
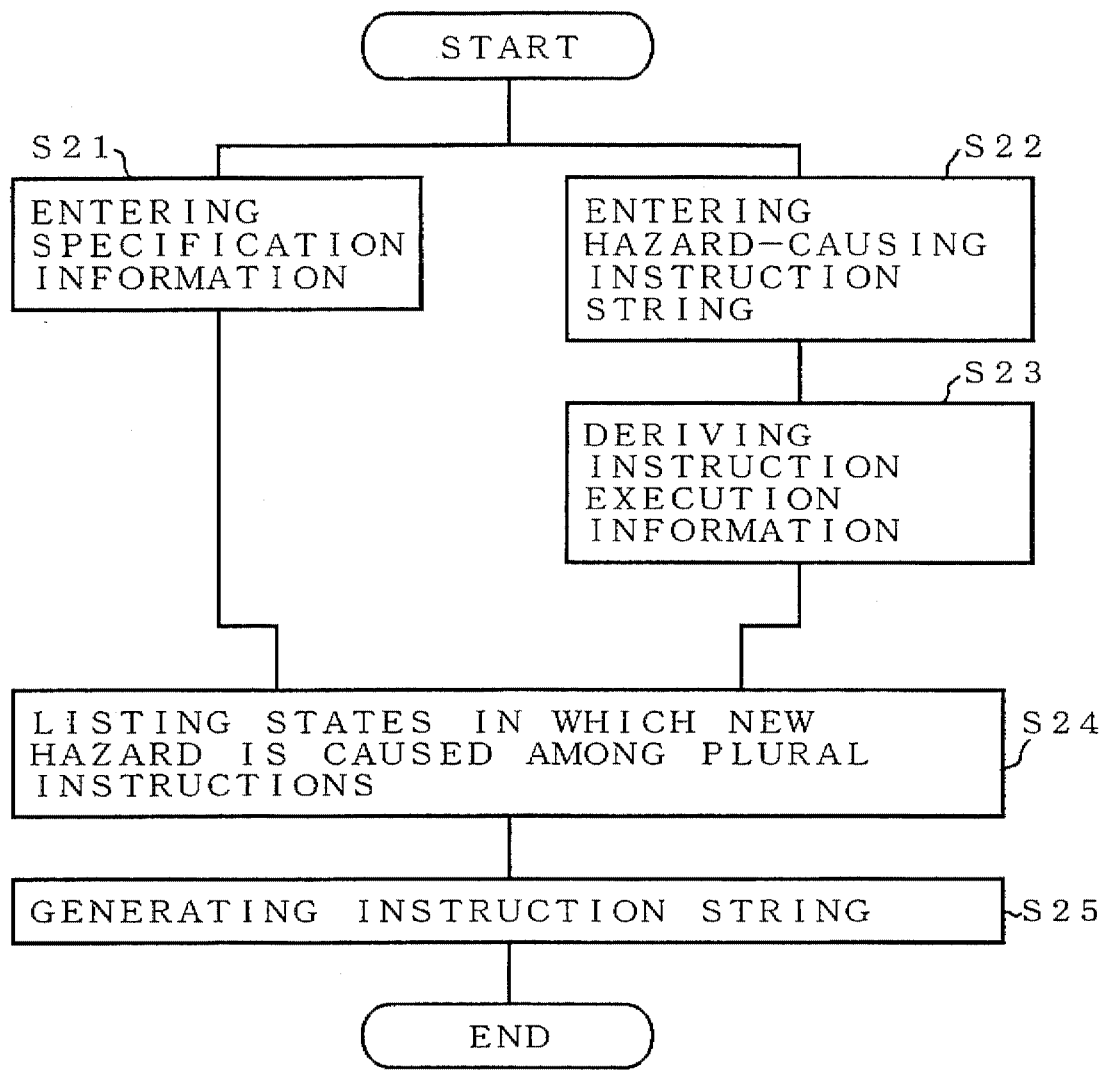
FIG. 5 shows the principle of the third method in which an instruction string is generated to verify the operation of the pipeline control mechanism according to the present invention.

FIG. 5 is the flowchart showing the third method of generating an instruction string for use in verifying the operation of the pipeline control mechanism.

As in the first and second methods, input is the specification information about each instruction executed by the processor (step S21). Additionally input is an instruction string generated by the first or the second method after a hazard among a plurality of instructions (step S22). If the instruction string is input, obtained is the pipeline process information used when the instruction string is actually executed by the processor (step S23). The pipeline process information indicates a pipeline process in which a pipeline interlock control is correctly performed using a stall cycle for the purpose of removing a hazard by the pipeline control mechanism of the processor. According to the present embodiment, the pipeline process information is hereinafter referred to as the "instruction execution information".

Based on the instruction execution information obtained in step S23 and the specification information input in step S21, listed is a state in which a hazard arises among a plurality of instructions (step S24). In this state, a hazard arises by adding a new instruction to the instruction string input in step S22.

Then, generated is an instruction string corresponding to each state listed in step S24 (step S25).

Thus, the second instruction string is generated in the third method by adding an instruction causing a new hazard to the first instruction string for verification generated by the first or the second method. Therefore, after confirming that the pipeline control mechanism of the processor correctly controls the first instruction string for verification, the second instruction string generated by the third method is used. Thus, it is determined whether or not the pipeline control mechanism can perform a complicated pipeline interlocking control. That is, after clearing the hazard of the first instruction string, the second instruction string generated by the third method generates a new hazard between the instructions executed after the clearance of the hazard and the instructions in the first instruction string. Therefore, it is checked whether of not the above described pipeline control mechanism can perform such a complicated hazard detecting and clearing operation by having the processor execute the second instruction string.

Figure 6:
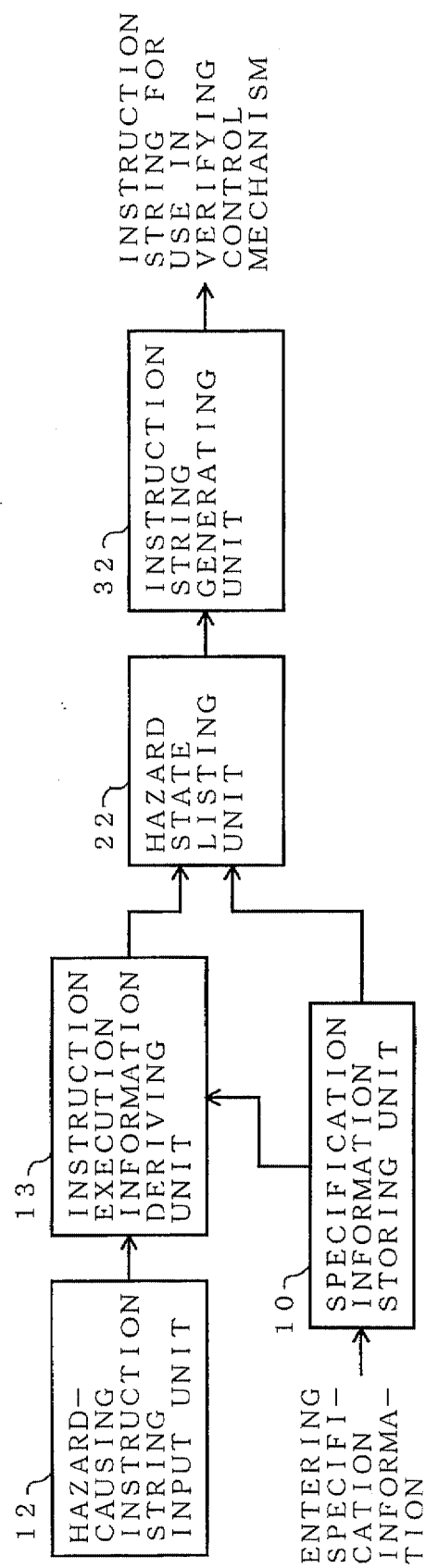
FIG. 6 is a block diagram of the device for generating the instruction string according to the above described third method.

FIG. 6 is the block diagram of the device for generating by the above described third method an instruction string for use in verifying the operation of the pipeline control mechanism.

The specification information storing unit 10 receives and stores the specification information about an instruction executed by the processor. A hazard-causing instruction string input unit 12 is a device for inputting an instruction string (hazard-causing instruction string) which causes a hazard among a plurality of instructions generated by the device shown in FIG. 2 or 4.

When an instruction execution information deriving unit 13 receives the hazard-causing instruction string from a hazard-causing instruction string input unit 12, it also receives from the specification information storing unit the specification information about each instruction forming the instruction string. According to the specification information, it obtains the instruction execution information about the hazard-causing instruction string.

When the new hazard state listing unit 22 receives information from the instruction execution information deriving unit 13 by referring to the specification information about each instruction stored in the specification information storing unit 10, it lists a state in which a new hazard is caused by executing a new instruction after an instruction string is input through the hazard-causing instruction string input unit 12 and then executed.

An instruction string generating unit 32 receives a state listed by the new hazard state listing unit 22, and generates an instruction string corresponding to each state.

Figure 7:
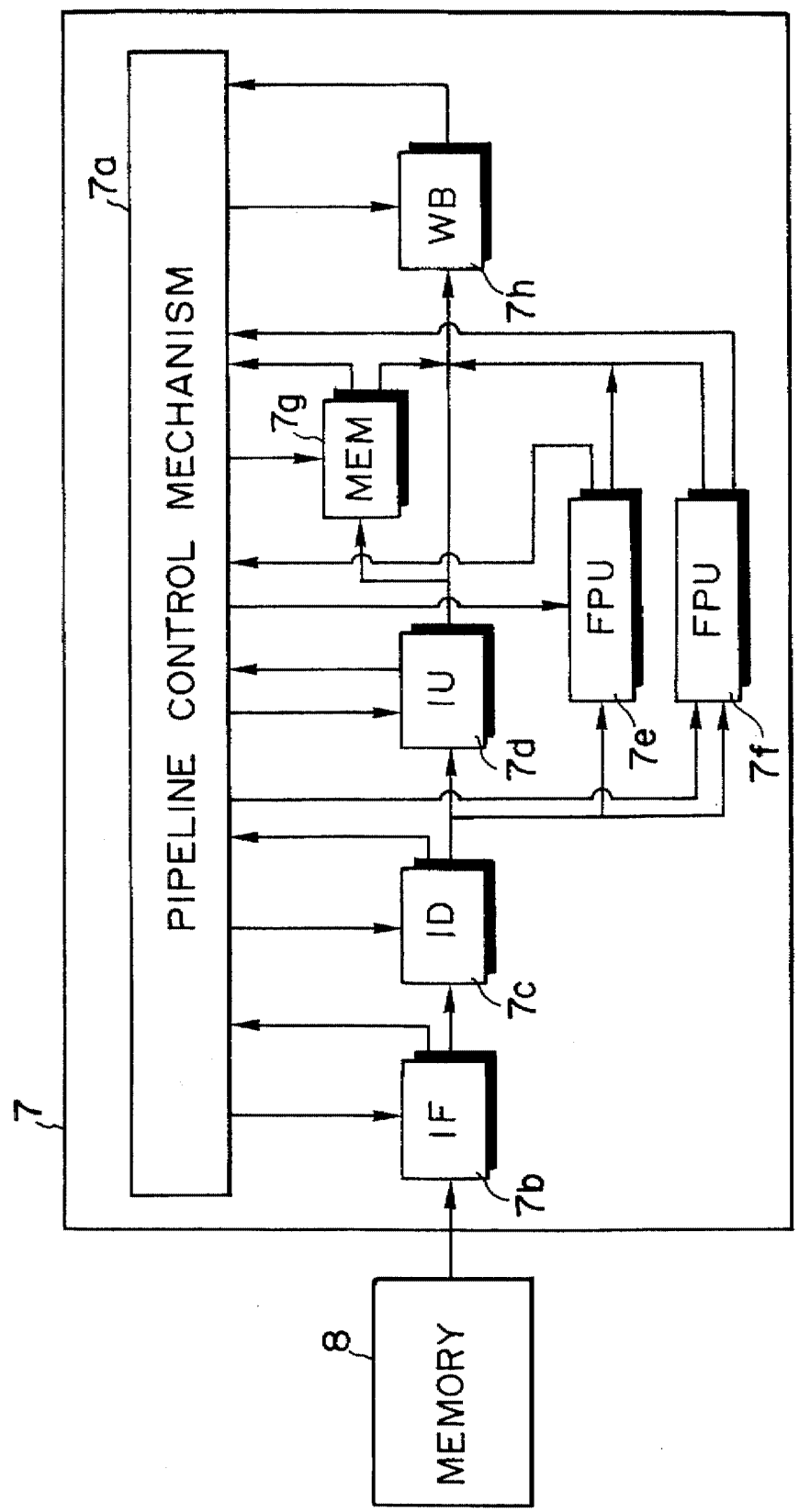
FIG. 7 is a block diagram indicating the pipeline process mechanism of a processor operated according to the present embodiment.

FIG. 7 is the block diagram of the internal configuration of a processor 7 associated with the device for automatically generating an instruction string for use in verifying the processor control mechanism of the present embodiment.

In FIG. 7, a memory 8 stores a program executed by the processor 7.

The processor 7 comprises an instruction fetching unit (IF unit) 7b, an instruction decoding unit (ID unit) 7c, an integer/logic operating unit (IU unit) 7d, two independent floating point operating units (FPU units) 7e and 7f, a memory access unit (MEM unit) 7g, a write back unit (WB unit) 7h, and a pipeline control mechanism 7d for detecting a hazard and controlling a proceeding and a stopping of the above listed units.

The instruction fetching unit 7b (hereinafter referred to as the IF unit 7b) reads from a memory an instruction at an address set in a program counter, and outputs it to the instruction decoding unit 7c and the pipeline control mechanism 7a. This corresponds to the IF stage of a pipeline.

The instruction decoding unit 7c (hereinafter referred to as the ID unit 7c) decodes the instruction received from the IF unit 7b, reads a necessary operand from a register, and outputs the operand to the integer/logic operating unit 7d or the floating point operating units 7e and 7f. This corresponds to the ID stage of a pipeline.

The integer/logic operating unit 7d (hereinafter referred to as the IU unit 7d) performs an integer/logic operation using an operand received from the ID unit 7c, and outputs the operation result to the write back unit 7h. It also generates an execution address, a branch-to address, etc. for memory access. These addresses are output to the memory access unit 7g. This corresponds to the IU stage of a pipeline. The two floating point operating units 7e and 7f (hereinafter referred to as FPU units 7e and 7f) perform a floating point operation using an operand received from the ID unit 7c. The operation result is output to the write back unit 7h. It also generates an execution address for memory access, and outputs it to the memory access unit 7g. This corresponds to the FPU stage of a pipeline. Thus, the memory access unit 7g (hereinafter referred to as the MEM unit 7g) accesses a memory by the execution address. Then, if a load instruction is issued, data are read from a memory and stored in the MDR (memory data register). If a store instruction is issued, data stored in the MDR are written to a memory. If a jump instruction is issued, a jump-to address is transferred to a PC (program counter). This corresponds to the MEM stage.

The write back unit 7h (hereinafter referred to as the WB unit 7h) receives operation results from the IU unit 7d or the FPU units 7e or 7f and writes them to a register. It also receives load data from the MEM unit 7g and writes them to the register. This corresponds to the WB stage.

As described above, the pipeline of the processor is composed of seven pipeline stages, that is, IF, ID, IU, FPU, MEM, and WB.

The processor uses a single fetch instruction in a single clock cycle. Every pipeline stage except the FPU is completed in a clock cycle. The FPU takes different clock cycles depending on the type of an instruction. That is, it takes two cycles with a FADD instruction, and four cycles with an FMUL instruction. There are two FPUs, and up to two floating point operations can be simultaneously performed.

With the configuration, a pipeline process can be performed through a plurality of paths as follows.

1. IF→ID→IU→WB
2. IF→ID→IU→MEM→WB
3. IF→ID→FPU→FPU→WB
4. IF→ID→FPU→FPU→FPU→FPU→WB

FIG. 8 shows the flow of the pipeline process of the instructions frequently used by the processor, that is, NOP, ADD, LOAD, FADD, and FMUL. In FIG. 8, IF, ID, IU, FRU, MEM, and WB are pipeline stages. Each of them is executed by the hardware resources IF unit 7b, ID unit 7c, IU unit 7d, FPU unit 7e and 7f, MEM unit 7g, and WB unit 7h. The descriptions GPR/R and GPR/W respectively under the pipeline stages ID and WB indicates that data are read (GPR/R) and written (GPR/W) from and to the GPR at a corresponding pipeline stage. The numbers 1 through 7 indicate the time (clock cycle) at which each pipeline stage is executed. Pipeline stages are processed in the ascending order. The information about the pipeline process for each instruction shown in FIG. 8 is used as the specification information when an instruction string for use in verifying the operation of the pipeline control mechanism 7a is automatically generated in the present embodiment. In FIG. 8, the hardware resources other than those described above (for example, a program counter, memory, etc.) are omitted here. That is, only the conflict for hardware resources to generate an instruction string for verification according to the present embodiment are considered.

Figure 9:
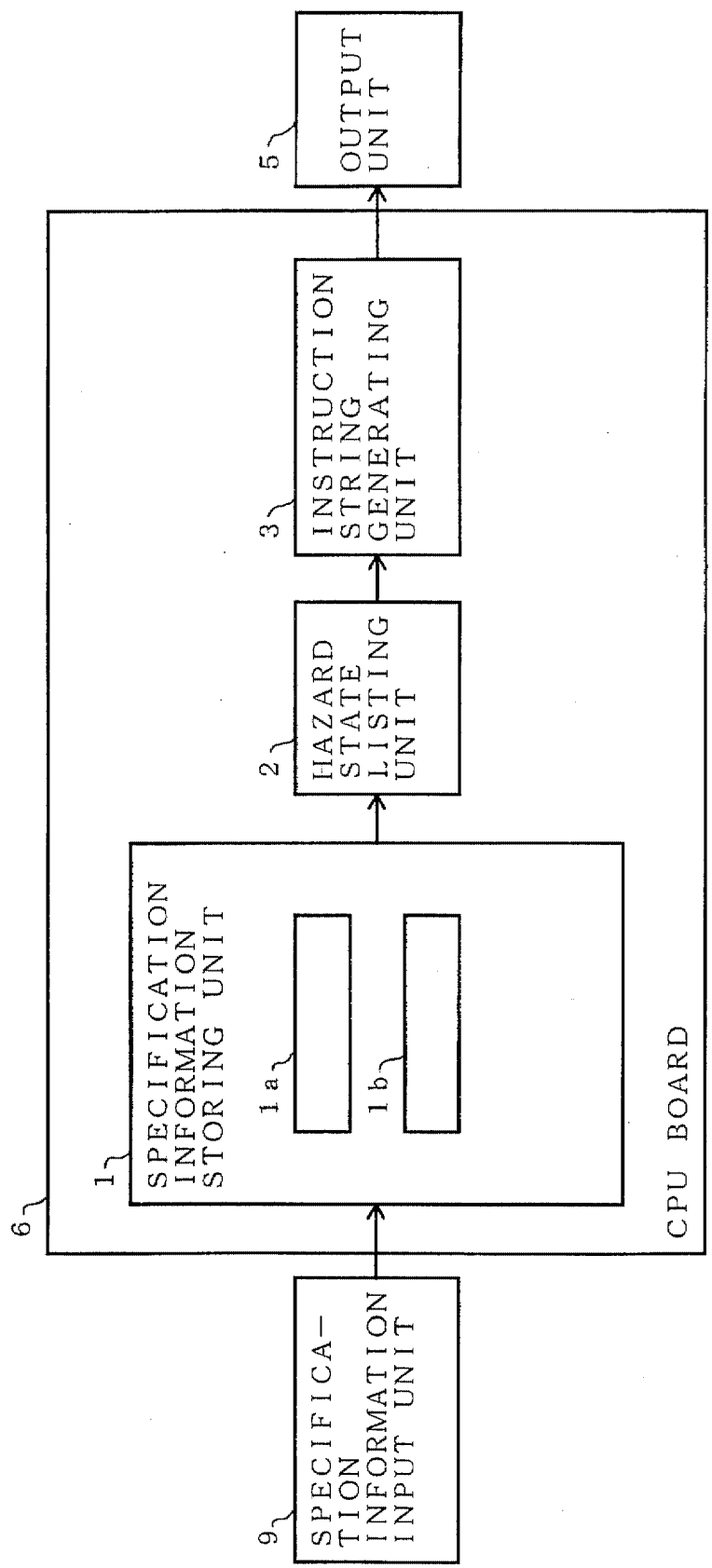
FIG. 9 is a block diagram of the device for automatically generating an instruction string for use in verifying the operation of the pipeline control mechanism of the processor shown in FIG. 7.

FIG. 9 is the block diagram of the device for automatically generating an instruction string for use in verifying the control mechanism of the processor 7 according to the first embodiment of the present invention.

A specification information input unit 9 inputs specification information for a pipeline process of each instruction which is to be processed in the pipeline process by the processor 7 shown in FIG. 7. The specification information input unit 9 can be, for example, a keyboard.

A CPU board 6 receives the specification information and generates an instruction string for use in verifying the control mechanism for the processor 7. The CPU board 6 comprises a specification information storing unit 1, the hazard state listing unit 2, and the instruction string generating unit 3.

The specification information storing unit 1 comprises a memory such as a RAM, and stores the specification information. The specification information is classified into information relating to the time taken by each instruction of each hardware resource and information relating to the time taken by a read/write of data in a register (GPR), a memory, etc. for each instruction. They are stored in areas 1a and 1b respectively.

The hazard state listing unit 2 reads the specification information from the specification information storing unit 1, and lists according to the specification information the information about a state in which a structural hazard, a data hazard, etc. are generated among a plurality of instructions in each pipeline stage.

An instruction string generating unit 3 generates an instruction string for use in verifying the operation of the pipeline control mechanism 7a according to the information indicating the state, listed by a hazard state listing unit 2, in which a hazard is caused among a plurality of instructions.

An output unit 5 comprises a display device or a print output device, etc., and displays or printouts an instruction string generated by the instruction string generating unit 3 for use in verifying the operation mechanism.

Figure 10:
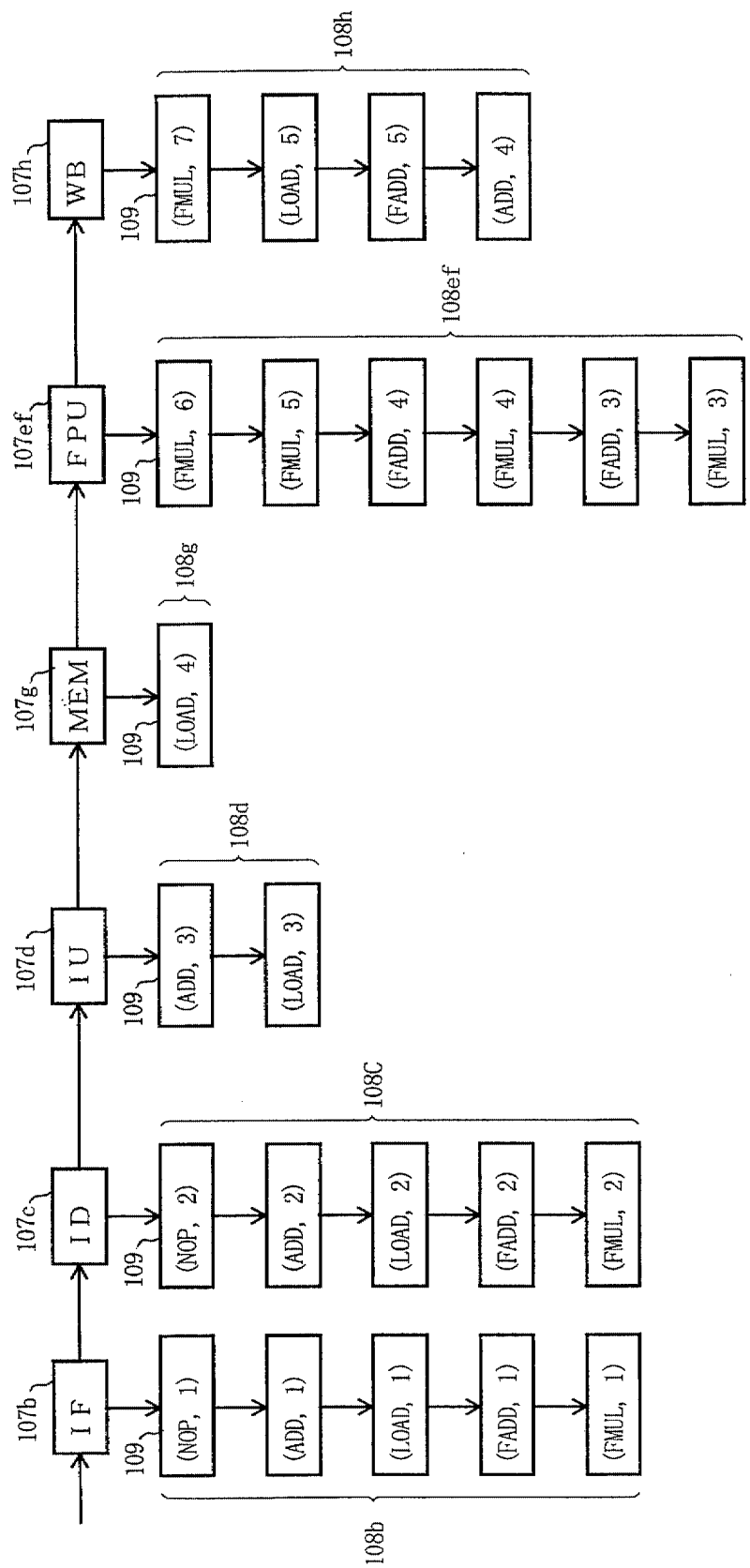
FIG. 10 shows an example of a data structure indicating the information about the time taken by each instruction shown in FIG. 8 to occupy each unit of the processor shown in FIG. 7.

FIG. 10 shows data structure of a hardware resource occupation information list 107 which is stored in area 1a in the specification information storing unit 1 and shows the time taken by each instruction shown in FIG. 8 to use each unit (hardware resource) when the processor 7 performs a pipeline process.

As shown in FIG. 10, the list is a linked list. Cells 107b, 107c, 107d, 107g, 107ef, and 107h respectively carry the characters IF, ID, IU, MEM, FPU, and WB. They respectively correspond to IF unit 107b, ID unit 107c, IU unit 107d, MEM unit 107g, FPU unit 107ef, and WB unit 107h. Each of the cells 107b through 107h is linked to each other in the order of the execution in the pipeline process.

Each of the cells 107b through 107h is linked to a corresponding list in linked lists 108b through 108h storing information about an execution start time in the pipeline process for all instructions executed by a corresponding unit. An element 109 of linked lists 108b through 108h has a structure consisting of three members, that is, an instruction, an execution time, and a pointer to the next cell 109.

Figure 11:
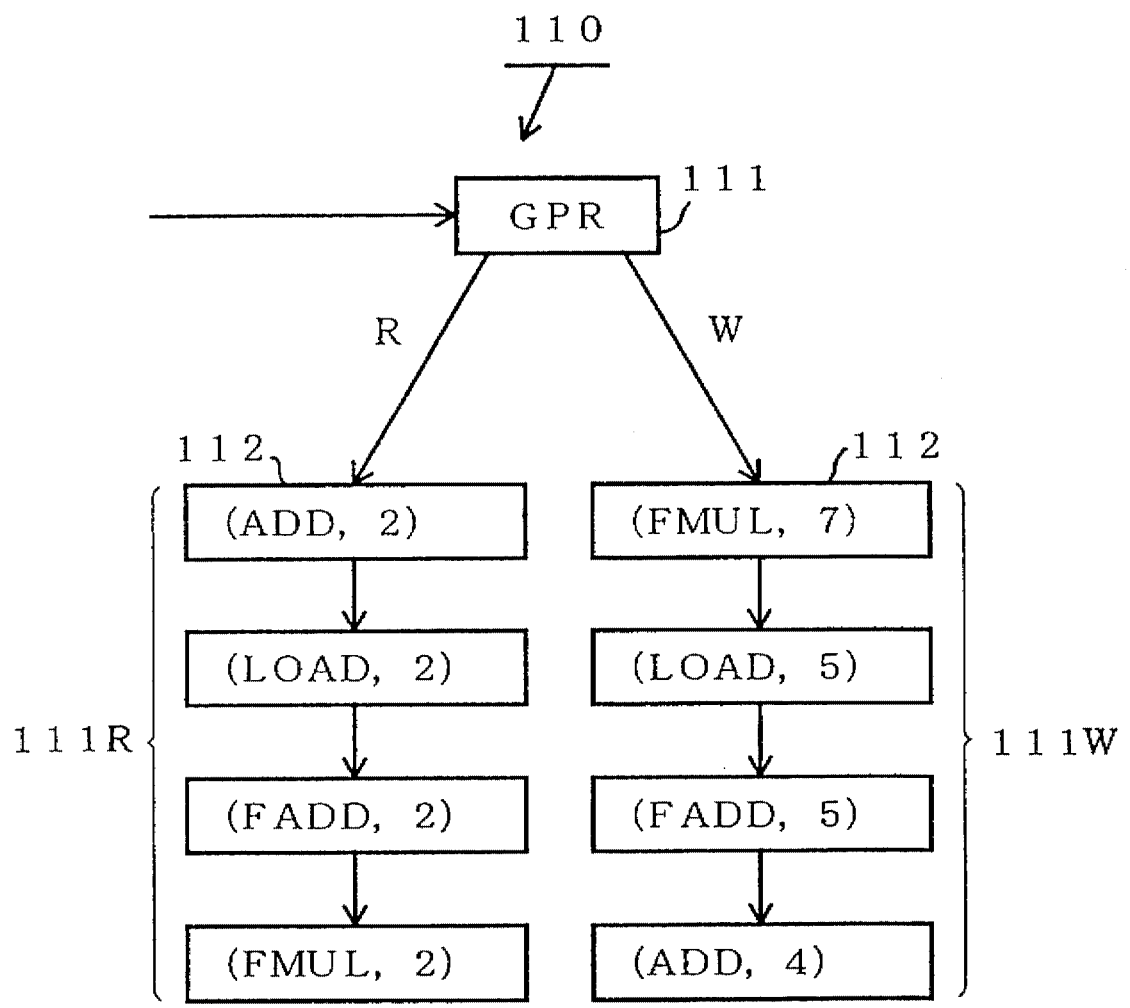
FIG. 11 shows an example of a data structure indicating the information about the time taken by the instruction shown in FIG. 8 to write/read data to and from a GPR (General purpose register) of the processor shown in FIG. 7.

FIG. 11 shows a data structure of an information list 110 about a reading/writing of data for the GPR stored in area 1b of the specification information storing unit 1.

In FIG. 11, a header 111F comprises a GPR data read information list 111R and a GPR data write information list 111W respectively classified into a reading of data (R:Read) and a writing of data (W:Write) for a data read/write instruction in the GPR.

A cell 114 in lists 111R and 111W has a structure similar to that of the cell 109 in lists 108b through 108h shown in FIG. 10, and consists of three elements of an instruction, an execution time, and a pointer to the next cell 112. The specification information storing unit 1, not shown in FIG. 11, stores a list shown in FIG. 11 of all hardware resources with which data are read/written except for the GPR.

Described below is the general operation of the device for generating an instruction string for use in verifying the operation of the control mechanism of the processor 7. The description is made by referring to the flowchart shown in FIG. 12.

Figure 12:
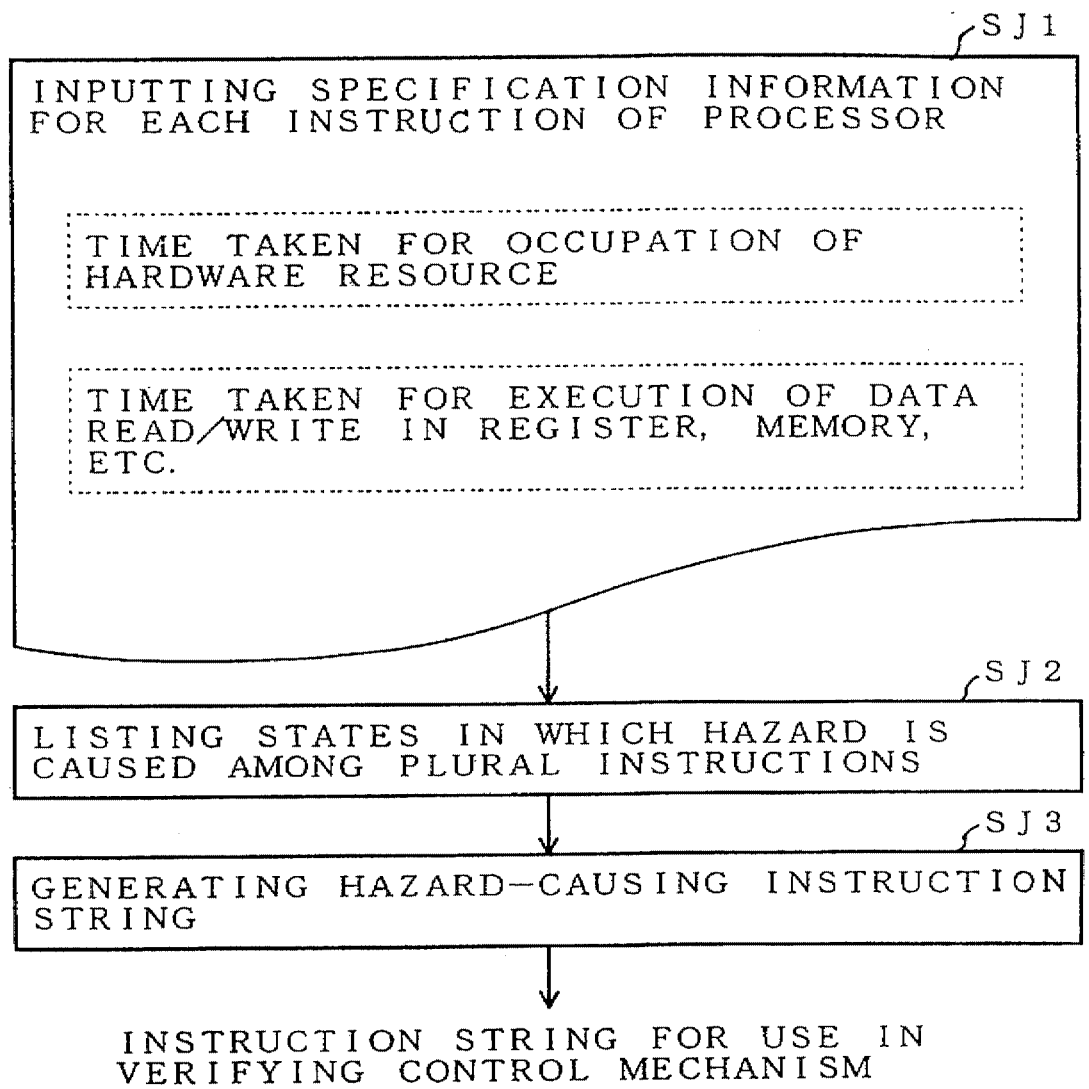
FIG. 12 is a flowchart indicating the operation of the first embodiment.

A hardware resource occupation time information list 117, hardware resource data read list 111R, and hardware resource data write list 111W are input from the specification information input unit 9. The lists 111R and 111W are stored in areas 1a and 1b respectively in the specification information storing unit 1 (step SJ1). As shown in FIG. 10, the hardware resource occupation time information list 117 stores information about the time taken by each instruction executed in the pipeline process by the processor 7 in each pipeline stage to use the hardware resources. As shown in FIG. 12, the hardware resource data read list 111R and hardware resource data write list 111W store information about the time taken by each of the instructions to read/write data from and to the GPR and the memory in the pipeline process.

The hazard state listing unit 2 lists information indicating the states in which structural hazards are caused among a plurality of instructions for all hardware resources used in the pipeline stages according to the hardware resource occupation time information list 117 stored in area 1a (step SJ2).

The process is practically performed for N hardware resources with which a pipeline stage is processed. The fetch start time of the pipeline process information about N+1 instructions which use the hardware resources is shifted in the execution order.

It is determined that a structural hazard has arisen if N+1 instructions simultaneously attempt to use N hardware resources.

Figure 13A:
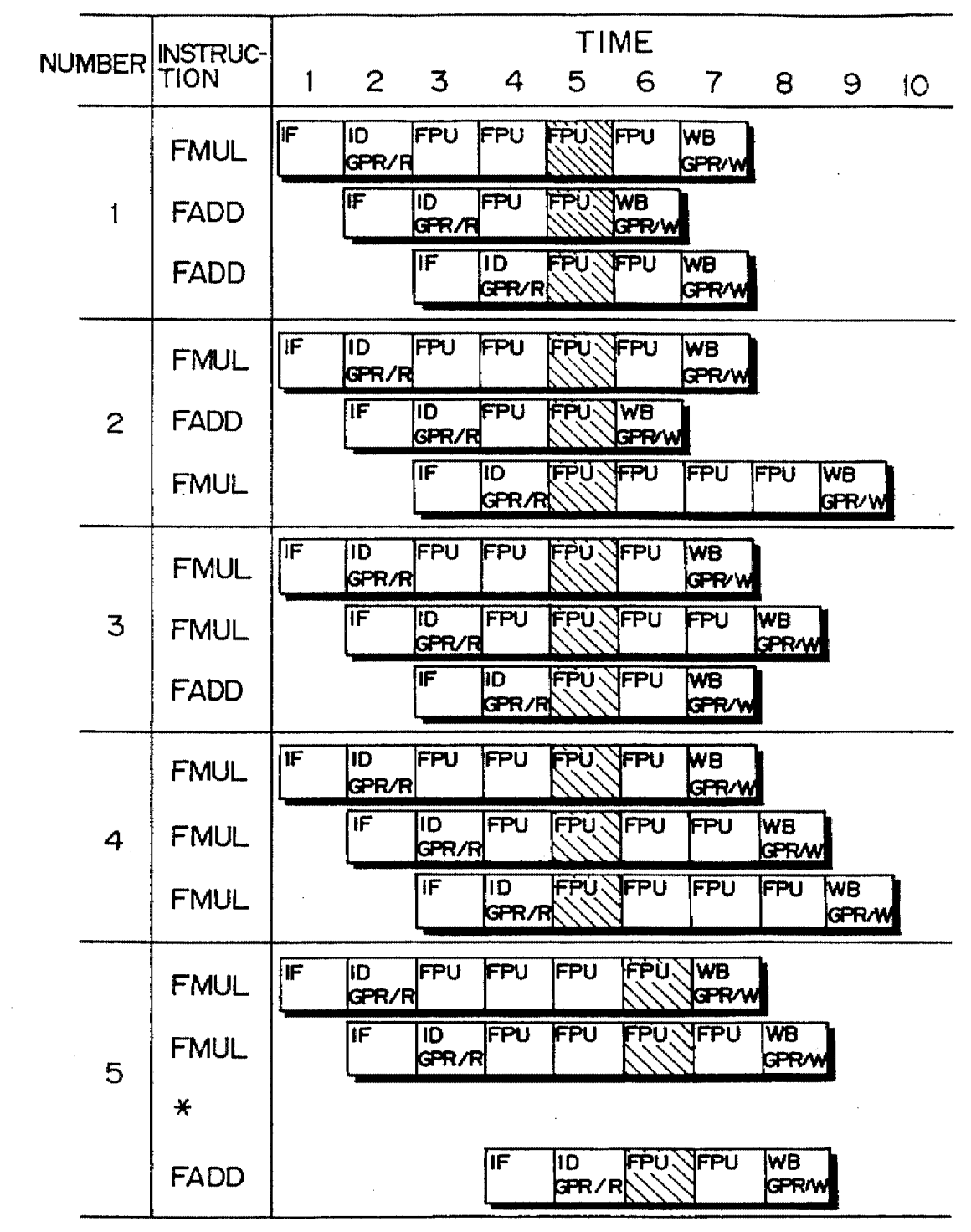

FIGS. 13A and 13B list states of structural hazards caused when three or more floating point operation instruction simultaneously attempt to use two floating point operating units 7e and 7f used in the FPU stage.

FIG. 14 lists states of structural hazards caused when two instructions simultaneously attempt to use write back unit 7h used in the WB stage. In each figure, * indicates, for example, an NOP instruction. This holds true with other figures.

The hazard state listing unit 2 lists the execution sequences of a plurality of instructions causing data hazards for all hardware resources (registers, memories, etc.) in which data are read and written in each pipeline stage according to the hardware resource data read/write information lists 111R and 111W stored in area 1b in step SJ2. This is attained by shifting the execution start time of the pipeline processes for two instructions to be read/written from and to the same hardware resource until it is hard to obtain a normal execution result.

FIG. 15 shows the state in which a data hazard of a WAR is caused among two ADD instructions. In pipeline processes 1 and 2 shown in FIG. 15, the second ADD instruction reads from the GPR the data written thereto by the first ADD instruction in a normal access order. However, the above described two-pipeline process cause a WAR hazard when two ADD instructions access the same GPR.

That is, since a plurality of GPRs are normally provided as register files in the processor 7, a WAR hazard is caused in a pipeline process of the two ADD instructions only when the destination operand of the first ADD instruction and the source operand of the second ADD instruction refer to the same GPR. Likewise, listed are all combinations of instruction strings which write/read to and from a GPR and cause a data hazard except the state shown in FIG. 15. In this case, a data hazard is not limited to a WAR hazard, and can be another type of data hazard such as a WAW hazard.

FIG. 16 shows an example of an instruction string causing a WAW hazard.

Example 1 is a case where instructions FMUL and LOAD are executed in series. In example 2, instructions EMUL and LOAD are executed with another instructions executed between them. In this case, a structural hazard is also caused at time 7 in WB unit 7h.

The listing unit 2 lists the states in which various hazards are caused in step SJ2 as shown in FIGS. 13A, 13B, 14, 15, and 16. Then, it also lists the states in which a number of hazards are caused as a combination of a plurality of the above listed states in a single execution. Thus, listed can be the states in which an instruction string causes a hazard for the first time at the last instruction, in which hazards are generated a plurality of times, etc.

Then, the instruction string generating unit 3 receives the listed information from the listing unit 2, and generates as a test program of the processor 7 an instruction string causing a hazard (step SJ3).

Thus, for example, an instruction string FMUL-FADD-FADD is generated according to the information about resource conflict states causing a structural hazard in the FPU stage indicated by number 1 in FIG. 13A. Likewise, an instruction string LOAD-ADD is generated according to the information about resource conflict states causing a structural hazard in the WB stage indicated by number 1 in FIG. 14. Furthermore, an instruction string causing other hazards, that is, structural hazards and data hazards shown in FIGS. 13A, 13B, 14, and 15 is generated. Additionally generated is an instruction string causing a plurality of hazards by a single execution of a combination of a plurality of instruction strings.

Figure 17:
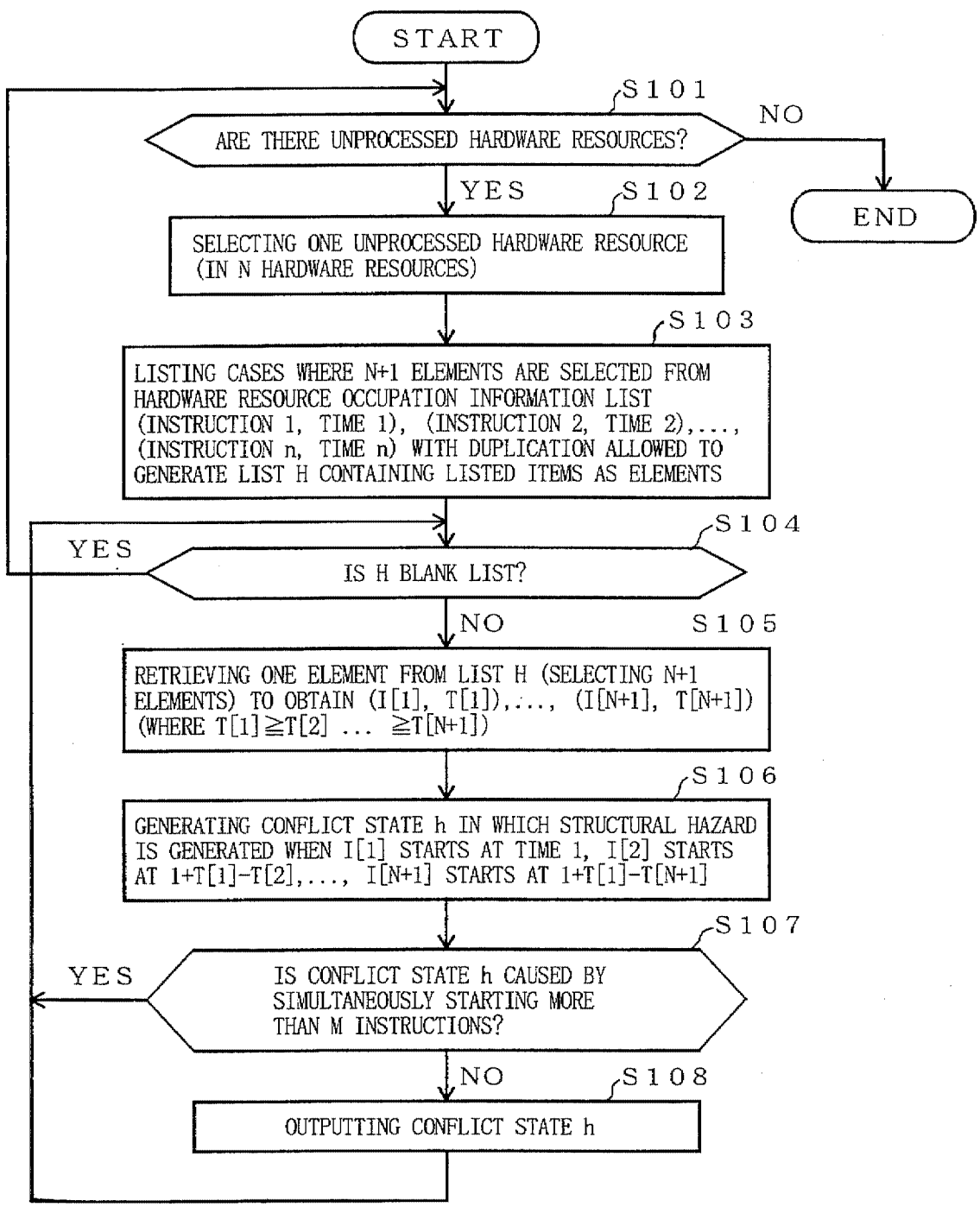
FIG. 17 is a flowchart showing the operation of the conflict state listing unit shown in FIG. 9 which lists the states of conflicts among a plurality of instructions causing structural hazards due to a conflict for hardware resources.
Figure 18:
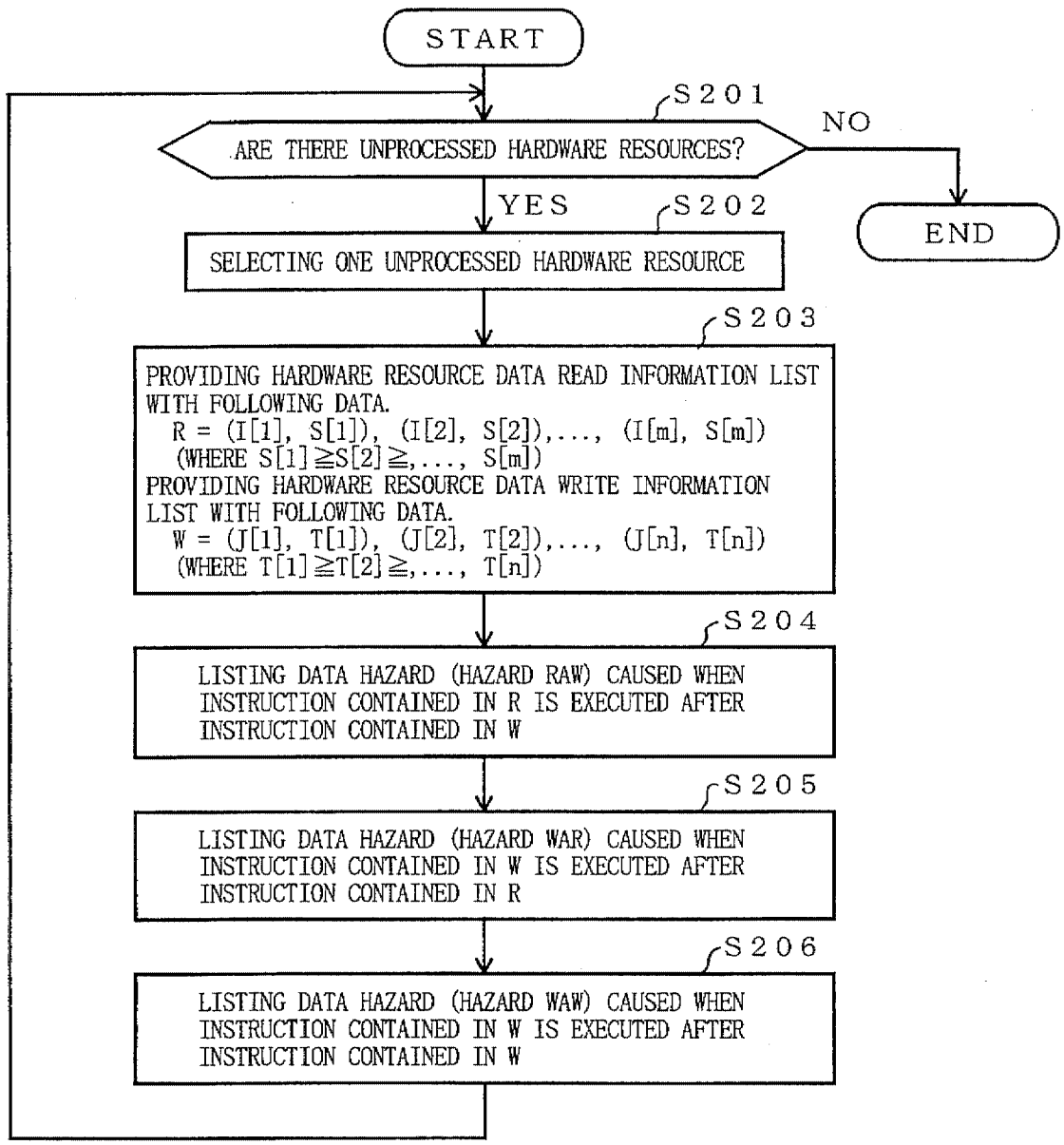
FIG. 18 is a flowchart showing the operation of the conflict state listing unit shown in FIG. 9 which lists the states of conflicts among a plurality of instructions causing data hazards through RAW, WAR, and WAW hazards.
Figure 19:
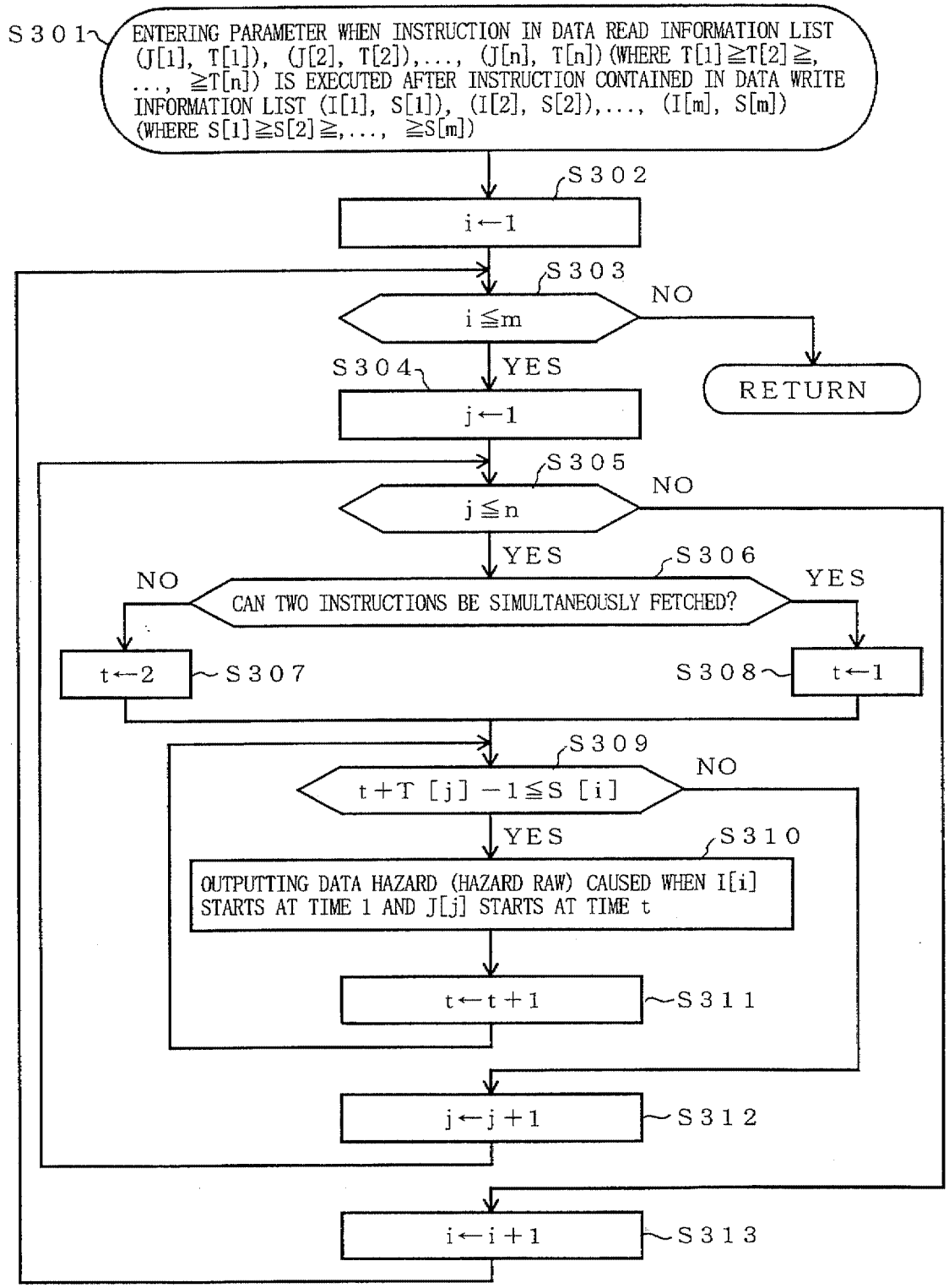
FIG. 19 is a flowchart showing in detail the operation of the conflict state listing unit which lists the states of conflicts among a plurality of instructions due to an occurrence of a RAW hazard.

The operation of the hazard state listing unit 2 performed in step SJ2 shown in the flowchart in FIG. 12 are explained in detail by referring to the flowcharts shown in FIGS. 17 through 19.

FIG. 17 shows the operation of the hazard state listing unit 2 in detecting a structural hazard.

The hazard state listing unit 2 reads the hardware resource occupation information list 107 stored in area 1a of the specification information storing unit 1 as shown in FIG. 10, and selects unprocessed hardware resources from the list 107 in the link order (step S101) until it is determined that all processes have been completed for the entire hardware resource occupation information list 107 (No in step S101).

Then, listed are the cases where N+1 elements (instruction i, time i)(i=1~n) are selected as 1 larger than the number N of the hardware resources from the occupation information list 108b of the selected hardware resources with duplication allowed. They are entered in a list H (step S103).

After the processes S102 and S103, the list H is generated for IF unit 7b, ID unit 7c, IU unit 7d, MEM unit 7g, FPU unit (7e and 7f), and WB unit 7h.

Since the processor 7 of the present embodiment is provided with two FPU units 7e and 7f, selected from the list 108ef are the cases where three elements 109 (with duplication allowed) with which floating point operation instructions such as an FMUL, FADD, etc. are executed through an exclusive use of the FPU stage. The listed cases are entered in a linked list 113. Each cell 114 in the linked list 113 is a structure consisting of three members "a pointer to the next cell 114, an instruction, and an instruction start time". In the linked list 113, the cell 114 is linked in the order from the latest in instruction start time.

Thus, the linked list 113 is fetched from the list H each time the list H is generated for each of the units 7a through 7h until the list is determined to be a blank list (yes in step S104). The "instruction: instruction start time" stored in each cell 114 in the linked list 113 is represented as (I[1], T[1]), (I[2], T[2]), ..., (I[N+1], T[N+1]), where $T[1] \geq T[2] \geq ..., T[N+1]$ (step S105). I[1], I[2], ..., I[N+1] are variables with which instructions such as FMUL, FADD, ADD, LOAD, etc. executed by the processor 7 are set. T[1], T[2], ..., T[N+1] are variables with which a start time for a corresponding instruction I[1], I[2], ..., I[N+1] in a corresponding pipeline stage is set. Thus, I[1], I[2], ..., I[N+1] are hereinafter referred to as instructions I[1], I[2], ..., I[N+1]. Likewise, T[1], T[2], ..., T[N+1] are referred to as time T[1], T[2], ..., I[N+1].

If instructions I[1], I[2], and I[N+1] are started at times 1, {1+T[1]−T[2]}, and {1+T[1]−T[N+1]} respectively, then generated is a conflict state h in which a structural hazard is caused (step S106). Times 1, {1+T[1]−T[2]}, ... , {1+T[1]−T[N+1]} respectively correspond to times 1, 2, ... , 10 shown in FIGS. 13A and 13B.

The process in step S106 is performed, for example, as follows.

First, since each of the instructions I[1], I[2], and I[N+1] are started at times 1, {1+T[1]−T[2]}, ... , {1+T[1]−T[N+1]} respectively, the time for each of the elements (I[1], T[1]), (I[2], T[2]), ... , (I[N+1], T[N+1]) is changed.

That is, the time is changed as followed.

| | | |
|---|---|---|
| T[1] | → | 1 (= T'[1]) |
| T[2] | → | 1 + {1 + T[1] − T[2]} (= T'[2]) |
| T[N + 1] | → | 1 + {1 + T[1] − T[N + 1]} (= T'[N + 1]) |

Then, the linked lists (1, T[1]), (T'[2], I[2]), ... , (T'[N+1], I[N+1]) in this order are set as a conflict state h.

FIGS. 23A through 23J show a data structure of a linked list indicating the conflict state h, and shows an example of a conflict state h in which a structural hazard is generated in an FPU stage.

The conflict state h is represented in lists 115A through 115J by linking a cell 116 comprising three members, that is, a pointer to the next cell, an instruction start time, and an instruction, in the execution order. List 115A is generated based on the linked list 113 of (FMUL, 5)→(FADD, 4)→(FADD, 3) not shown in FIG. 22. List 115E is generated based on the linked list 113 of (FMUL, 6)→(FMUL, 5)→(FADD, 3) shown in FIG. 22.

A linked list containing (1:FMUL)→(1:FMUL→(1:FMUL) is generated as a conflict state h according to the linked list 113 containing (FMUL, 6)→(FMUL, 6)→(FMUL, 6), (FMUL, 3)→(FMUL, 3)→(FMUL, 3), etc.

Then, it is determined whether or not the conflict state h generated in the above described step S106 is caused by more than M instructions started simultaneously (step S107). M indicates the number of IF units provided in the processor 7. That is, M equals the number of simultaneously fetched instructions.

Since the processor 7 is provided with only one IF unit in the present embodiment, M indicates 1. In the case of a processor of a super-scalar method, M indicates an integer larger than 1.

In the above described step S107, unless the conflict stake h is generated under the conditions above (No in step S107), the conflict state h is output to the instruction string generating unit 3 (step S108).

Thus, according to the present embodiment, a conflict state in which 2 or more instructions are to be simultaneously fetched, for example, a conflict state h represented by a linked list containing (1:FMUL)→(1:FMUL)→(1:FMUL), is determined to be "No" in step S107 among the conflict states h generated in the above described step S106, and is not output to the instruction string generating unit 3.

On the other hand, the conflict state h represented in linked lists 115A through 115J shown in FIGS. 23A through 23J are output to the instruction string generating unit 3.

Figure 22:
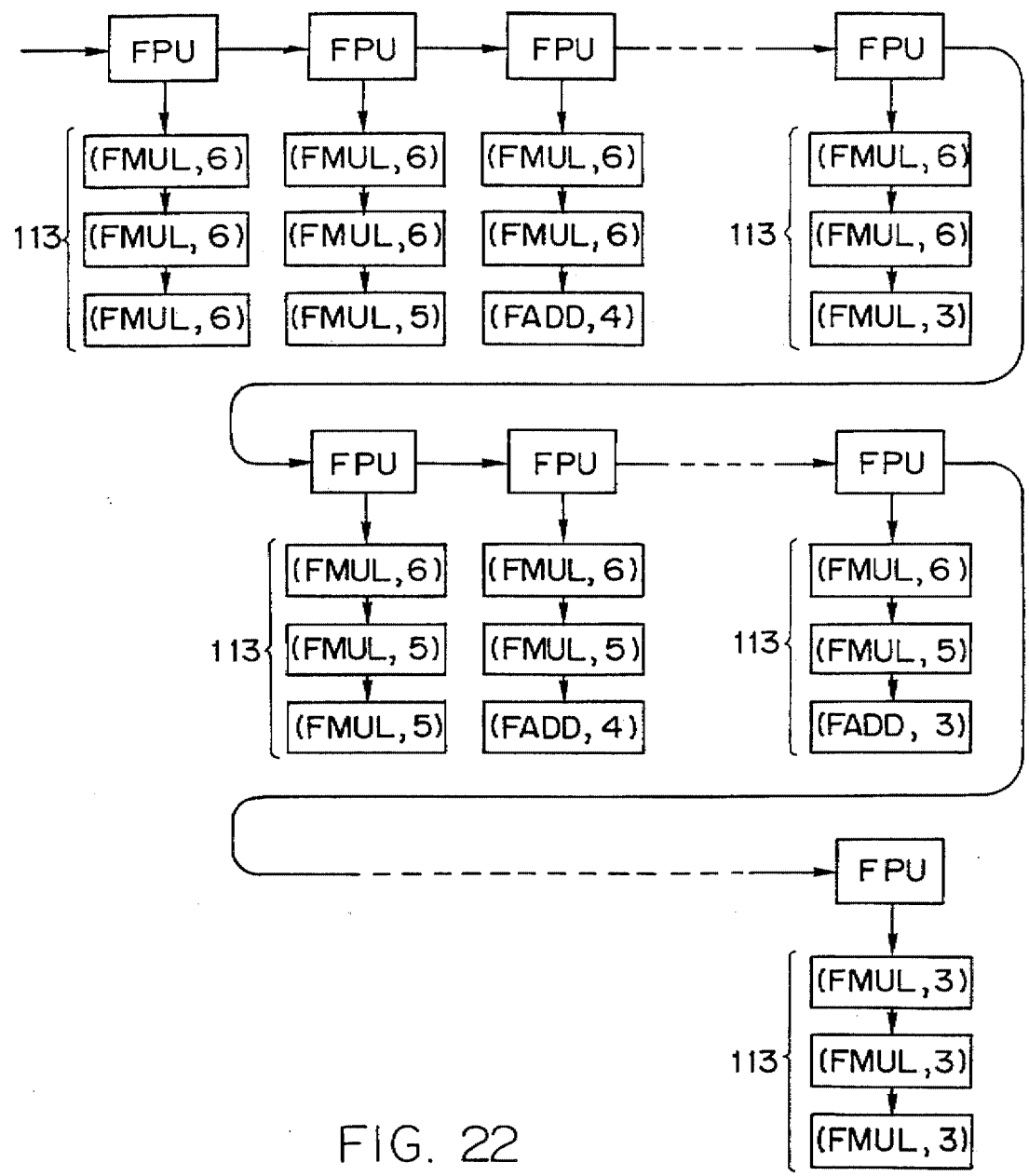
FIG. 22 shows an example of a data structure indicating the listed states in which three instructions simultaneously occupy an FPU unit.

The processes in the above described steps S104 through S108 are repeatedly performed until all lists 120 are retrieved from the list H. When the processes in steps S104 through S108 are completed for a specific hardware resource, control is returned to step S101. If any hardware resource remains unprocessed, the link of the hardware resource occupation information list 107 is traced to select the next hardware resource to be processed from among the hardware resource lists 108b through 108h in step S102. Then, the list H as shown in FIG. 22 is generated in step S103 for the hardware resource, and the processes in steps S105 through S108 are performed on all lists 113 in the list H.

The conflict state h corresponding to an instruction string causing a structural hazard when the processor 7 starts the execution of the last instruction as shown in FIGS. 13A, 13B, and 14 is output from the hazard state listing unit 2 to the instruction string generating unit 3.

When the instruction string generating unit 3 receives the conflict state h represented in lists 115A through 115J from the hazard state listing unit 2, it generates an instruction string represented in linked lists 117A through 117J containing a data structure shown in FIGS. 24A through 24J. A cell 118 of these linked lists 117A through 117J is a structure consisting of two members, that is, a pointer to the next cell 118 and an instruction. An instruction * is an optional instruction which does not cause a hazard for a preceding instruction, for example, a NOP instruction.

The instruction string generating unit 3 refers to the instruction start time of the cells 116 forming the above described lists 115A through 115J. If the instruction start time of the adjacent cell 116 does not indicate serial numbers, the instruction string generating unit 3 inserts a cell 118 having a data structure consisting of a pointer to the next cell 118 and * so that the instruction start time indicates serial numbers (FIGS. 24E through 24J). A similar process is performed on a conflict state h other than the case above to generate an instruction string for the conflict state h.

FIG. 18 is the flowchart showing the process in step SJ2 of listing the conflict states RAW, WAR, and WAW in which data hazard is caused.

In this case, the hazard state listing unit 2 selects one unprocessed hardware resource from among the hardware resources such as a GPR and a memory, etc. for storing information about the time at which data stored in area 1b are read and written (steps S201 and S202).

For example, a GPR is selected as a hardware resource and receives from area 1b the GPR data read information list 112R and the GPR data write information list 112W shown in FIG. 11 (step S203).

In this case, the list 112R contains (ADD, 2)→(LOAD, 2)→(FADD, 2)→(FMUL, 2). Then, the list 112W containing (FMUL, 7)→(LOAD, 5)→(FADD, 5)→(ADD, 4) is entered.

Thus, the hardware resource data read information list R is represented as (I[1], S[1])→(I[2], S[2])→ ... →(I[m], S[m]). The hardware resource data read information list W is represented as (J[1], T[1])→(J[2], T[2])→ ... →(J[n], T[n]). In these representations, I[1], I[2], ... , I[m] and J[1], J[2], ... , J[n] indicate instructions, while S[1], S[2], ... , S[m] and T[1], T[2], ... , T[n] indicate time, where $S[1] \geq S[2] \geq \ldots S[m]$, and $T[1] \geq T[2] \geq \ldots T[n]$.

Figure 20:
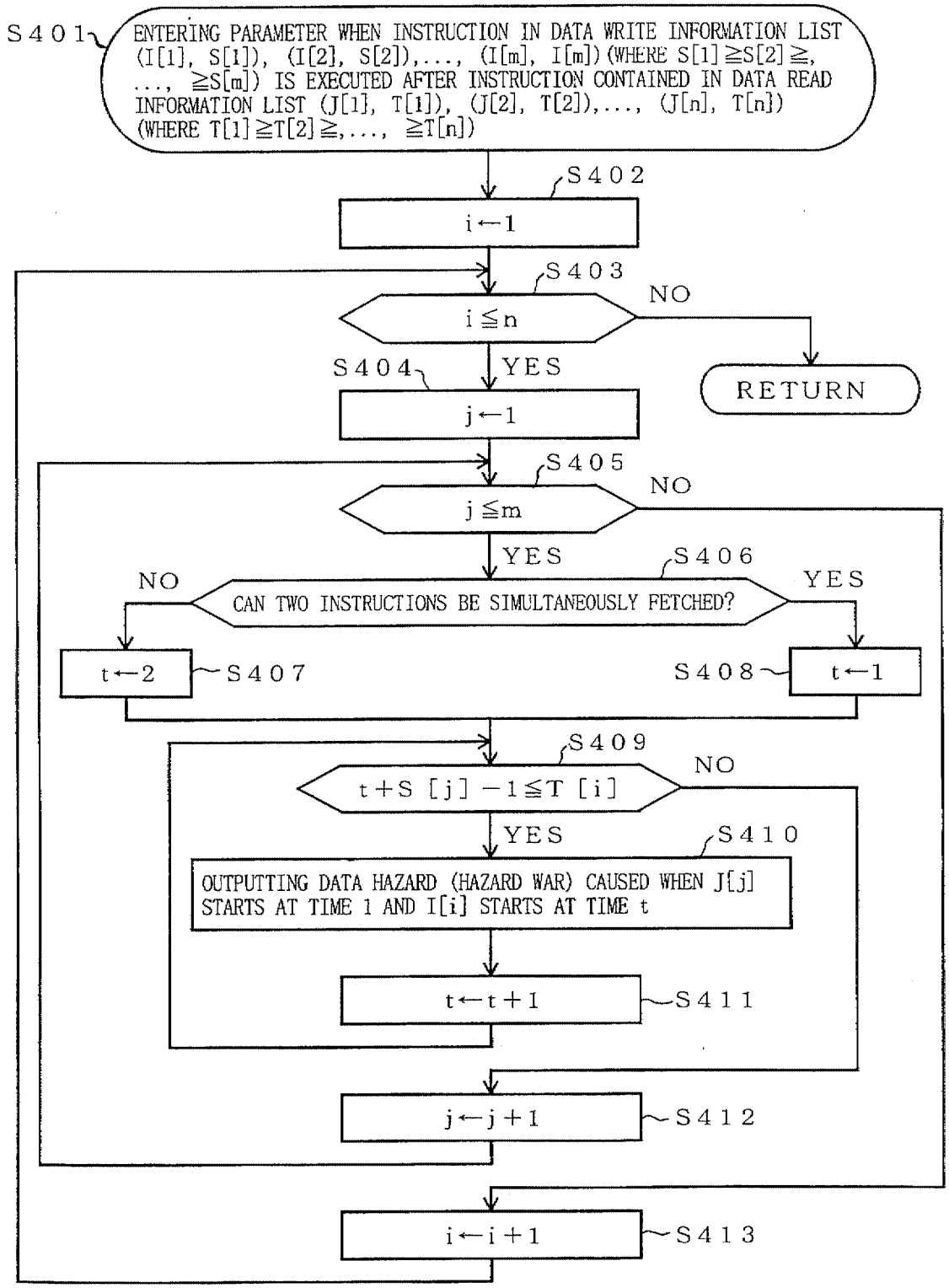
FIG. 20 is a flowchart showing in detail the operation of the conflict state listing unit which lists the states of conflicts among a plurality of instructions due to an occurrence of a WAR hazard.
Figure 21:
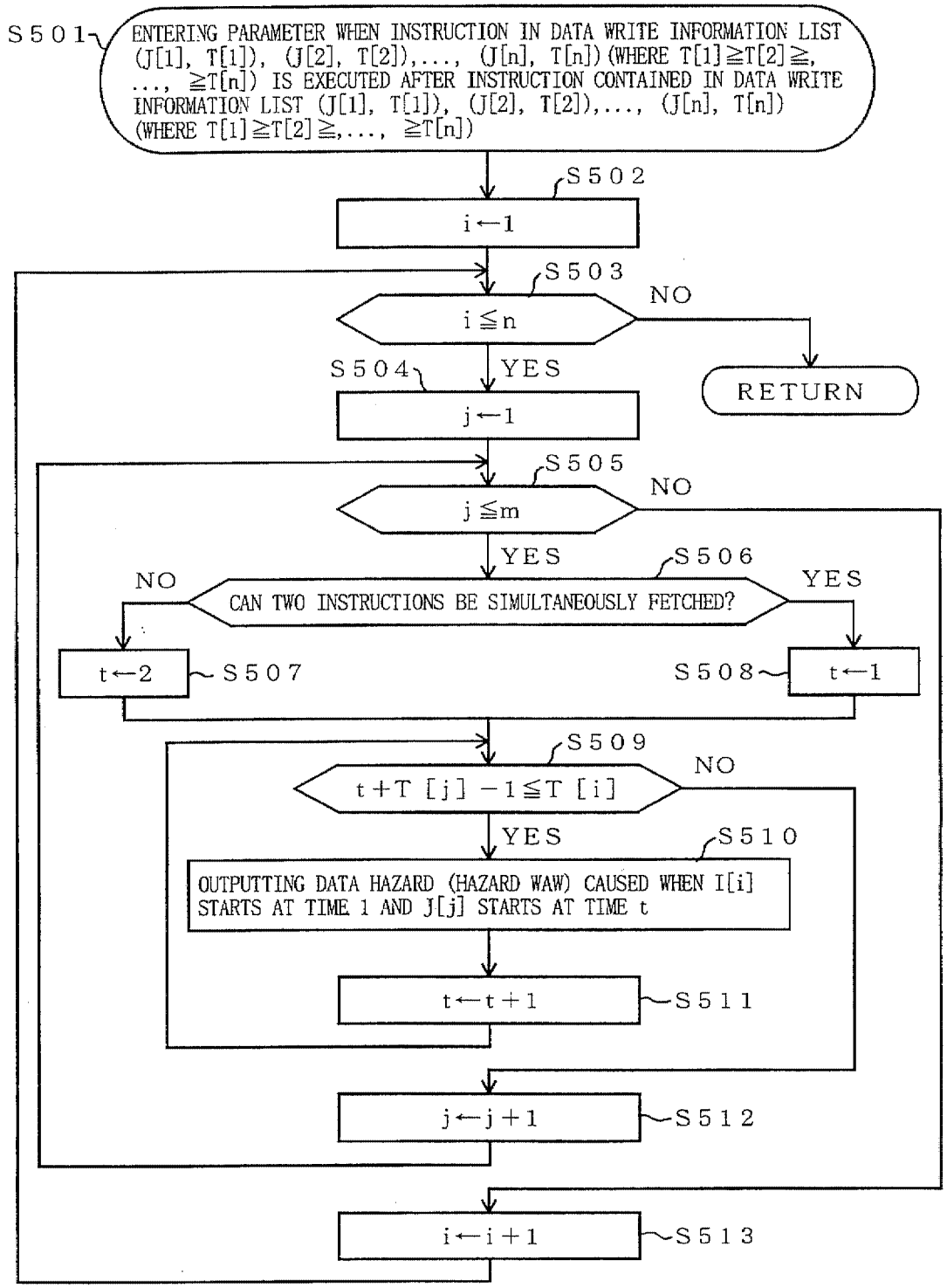
FIG. 21 is a flowchart showing in detail the operation of the conflict state listing unit which lists the states of conflicts among a plurality of instructions due to an occurrence of a WAW hazard.

Then, using parameters of the hardware resource read information list R and the hardware resource write information list W, called is a subroutine the process of which is explained in detail in the flowcharts shown in FIGS. 19 through 21 to sequentially execute the processes in steps S204, S205, and S206. Then, listed are a RAW state (step S204) causing a RAW hazard, a WAR state (step S205) causing a WAR hazard, and a WAW state (step S206) causing a WAW hazard.

That is, listed in step S204 is a data hazard state RAW arising when the instruction J[k] (k=1~n) included in the list R is executed after the execution of the instruction I[i] (i=1~m) included in the list W.

Then, listed in step S205 is a data hazard state WAR arising when the instruction I[i] included in the list W is executed after the execution of the instruction J[k] included in the list R.

Furthermore, listed in step S206 is a data hazard state WAW arising when the instruction J[k] included in the list W is executed after the execution of the instruction I[i] included in the list W.

FIGS. 19 through 21 are the flowcharts showing in detail the processes in steps S204, S205, and S206.

First explained is the flowchart shown in FIG. 19.

In this case, the data write information list (I[1]), S[1]), (I[2], S[2]), ... (I[m], S[m]) is entered as the first parameter (a list of instructions to be executed first), and the data read information list (J[1]), T[1]), (J[2], T[2]), ... (J[2], T[n]) is entered as the second parameter (a list of instructions to be executed after prioritized instructions) (step S301).

First, the variable i is set to 1 (step S302).

Then, it is determined whether or not the variable i is equal to or smaller than m (step S303). The determination is made to check whether or not the process has been performed on all elements in the data write information list. The variable i is used to select the instruction I[i] from all elements in the data write information list which is the first parameter.

If i≦m (yes in step S303), then the variable j is set to 1 (step S304), and it is determined whether or not the variable j is equal to or smaller than n (step S305). The determination is made to determine whether or not a check has been completed as to whether or not a data hazard state RAW is generated for all instructions J[1] (l=1~n) in the data read information list for each instruction I[i] in the data write information list. That is, if j>n, then it is determined that all processes have been completed for the instruction I[i] (No, step S305). If j≦n, then it is determined that all processes have not been completed (yes in step S305). Then, it is determined whether or not the processor 7 is ready to simultaneously fetch two instructions (step S306).

Unless two instructions can be simultaneously fetched (No in step S306), the variable t is set to 2 (step S307). If yes in step S306, then the variable t is set to 1 (step S308). The variable t is used to adjust the time taken by the instruction J[j] of the read information list to read data from a corresponding hardware resource depending on the determination as to whether or not two instructions can be simultaneously fetched.

After setting the variable t to 1 or 2 in step S307 or S308, it is determined whether or not the value t+T[j]−1 (j=1) is equal to or smaller than S[i] (i=1) (step S309).

By setting the variable t as described above, the value (t−1) in {t+T[j]−1} in step S309 is 0 if two instructions can be simultaneously fetched, and 1 if they cannot. Thus, if two instructions can be simultaneously fetched, then it is determined whether or not a RAW hazard arises when the instruction I[1] and the instruction J[1] are simultaneously started for execution. On the other hand, unless two instructions can be simultaneously fetched, it is determined whether of not a RAW hazard arises when the instruction I[1] starts at time 1 and the instruction J[1] starts at time 2.

That is, if the equation t+T[1]−1≦S[1] exists in step S309 (yes in step S309), then it is determined that a RAW hazard is caused by the flow-dependent instructions J[1] and I[1] because the succeeding instruction J[1] reads erroneous data before the instruction I[1] writes data to a corresponding hardware resource (yes in step S309).

If an occurrence of a RAW hazard is detected in step S309, then the cases are output to the instruction string generating unit 3 as a data hazard state RAW where the instructions I[1] and J[1] are started for execution at time 1 and t respectively (step S310).

Then, the variable t is incremented (+1) in step S311, and control is returned to step S309 again. The above described processes in steps S309 through S311 are repeatedly performed until t+T[j]−1>S[i] is determined in step S309. Thus, all data hazard states RAW generated by the combination of the two instructions J[1] and I[1] are listed, and the states are output to the instruction string generating unit 3.

When it is determined that the listing is completed (No in step S309), then the variable j is incremented (+1) (step S312) and control is returned to step S305. Then, the next instruction J[2] is retrieved from the data read information list R, and a data hazard state RAW which causes a RAW hazard is listed for the combination of the instructions J[2] and I[1] and output after performing the processes in steps S305 through S311.

Likewise, listed and output are data hazard states RAW in which a RAW hazard is caused by the combination of the instruction I[1] and the instructions J[3] through J[n] remaining in the data read information list.

If i>n in step S303 (No in step S305), then it is determined that the detection of RAW hazard has been completed for the instruction I[1], and the variable i is incremented (+1) (step S313).

Thus, the next element (I[2], S[2]) is fetched from the data write information list, and the processes in steps S303 through S313 are performed again.

Then, listed and output are data hazard states RAW in which a RAW hazard is caused between the instruction I[2] and the instructions J[j](j=1~n).

Likewise, listed and output are data hazard states RAW in which a RAW hazard is caused between the instruction I[3] through I[m] and the instructions J[j](j=1~n).

If i>n is determined in step S303 (No in step S303), then control is returned to the main program shown in the flowchart shown in FIG. 18.

FIG. 20 is the flowchart showing in detail the process of listing WAR hazard states in step S205 as shown in the flowchart in FIG. 18.

In this process, the data read information list (J[1], T[1]), (J[2], T[2]), ... (J[n], T[n]) is entered as the first parameter (a list of instructions to be executed first), and the data write information list (I[1], S[1]), (I[2], S[2]), ... (I[m], S[m]) is entered as the second parameter (a list of instructions to be executed after prioritized instructions) (step S401). The processes in step S402 through S413 are similar to those in the flowchart shown in FIG. 19.

That is, since the number of the preceding data read instructions J[1](l=1~n) stored in the data read information list is n and the number of the succeeding data write instructions I[k](k=1~m) stored in the data write information list is m, the determination about "i≦m" in step S303 is replaced with the determination about "i≦n" in step S403, and the determination about "j≦n" in step S305 is replaced with the determination about "j≦m" in step S405. Furthermore, the process in step S409 of detecting the occurrence of a WAR hazard refers to t+s[j]−1≦T[i]. Then, since it is determined that "t+s[j]−1≦T[i]" exists in step S409 (yes in step S409), output is a data hazard state WAR arising when the data read instruction J[j] and the data write instruction I[i] are started at time 1 and time t respectively (step S410).

Since data are read from the GPR at the ID stage according to the present embodiment as shown in FIG. 8, the reading always precedes a writing of data to the GPR at the WB stage. Therefore, no WAR hazards occur.

FIG. 21 is the flowchart showing in detail the process in step S206 shown in FIG. 18.

In this process, the data read information list (J[1], T[1]), (J[2], T[2]), ... (J[n], T[n]) is entered as the first parameter (a list of instructions to be executed first), and the data write information list (J[1], T[1]), (J[2], T[2]), ... (J[n], T[n]) is entered as the second parameter (a list of instructions to be executed after prioritized instructions) (step S501).

The processes in the flowchart in FIG. 21 are different from those in the flowchart in FIG. 19 in steps S503, S509, and S510.

That is, since the number of the preceding data write instructions J[1](l=1~n) is n in step S503, i≦n is determined. Likewise, t+T[j]−1≦T[i] is determined in step S509. Since is t+T[j]−1≦T[i] is determined in step S509 (yes in step S509), an occurrence of a WAW hazard is detected if the instructions J[i] and J[j] are started at time 1 and time t respectively. Such combinations of the instructions J[i] and J[j] are output as data hazard states WAW.

If, for example, (FMUL, 7) and (LOAD, 5) are selected as (J[i], T[i]) and (J[j], T[j]) respectively, output is a data hazard state WAW in which a WAW hazard is generated as shown by numbers 1 and 2 in FIG. 16.

Figure 25:
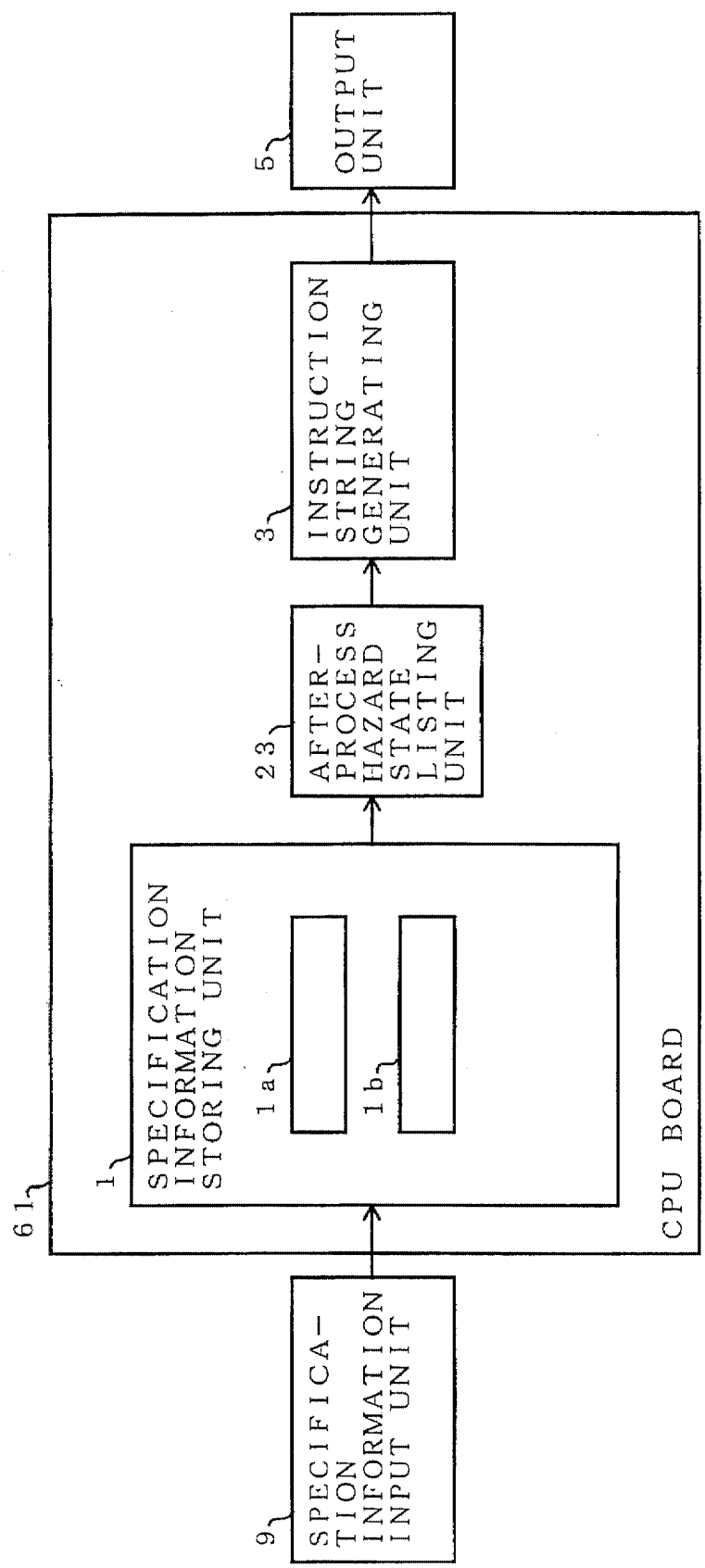
FIG. 25 is a block diagram of the device for automatically generating an instruction string for use in verifying the operation of the pipeline control mechanism of the processor shown in FIG. 7 according to a second embodiment of the present invention.

FIG. 25 is the block diagram of the device for automatically generating an instruction string for use in verifying a control mechanism according to the second embodiment of the present invention. In FIG. 25, a block also shown in FIG. 9 is assigned the same number as the corresponding block shown in FIG. 9.

Figure 26:
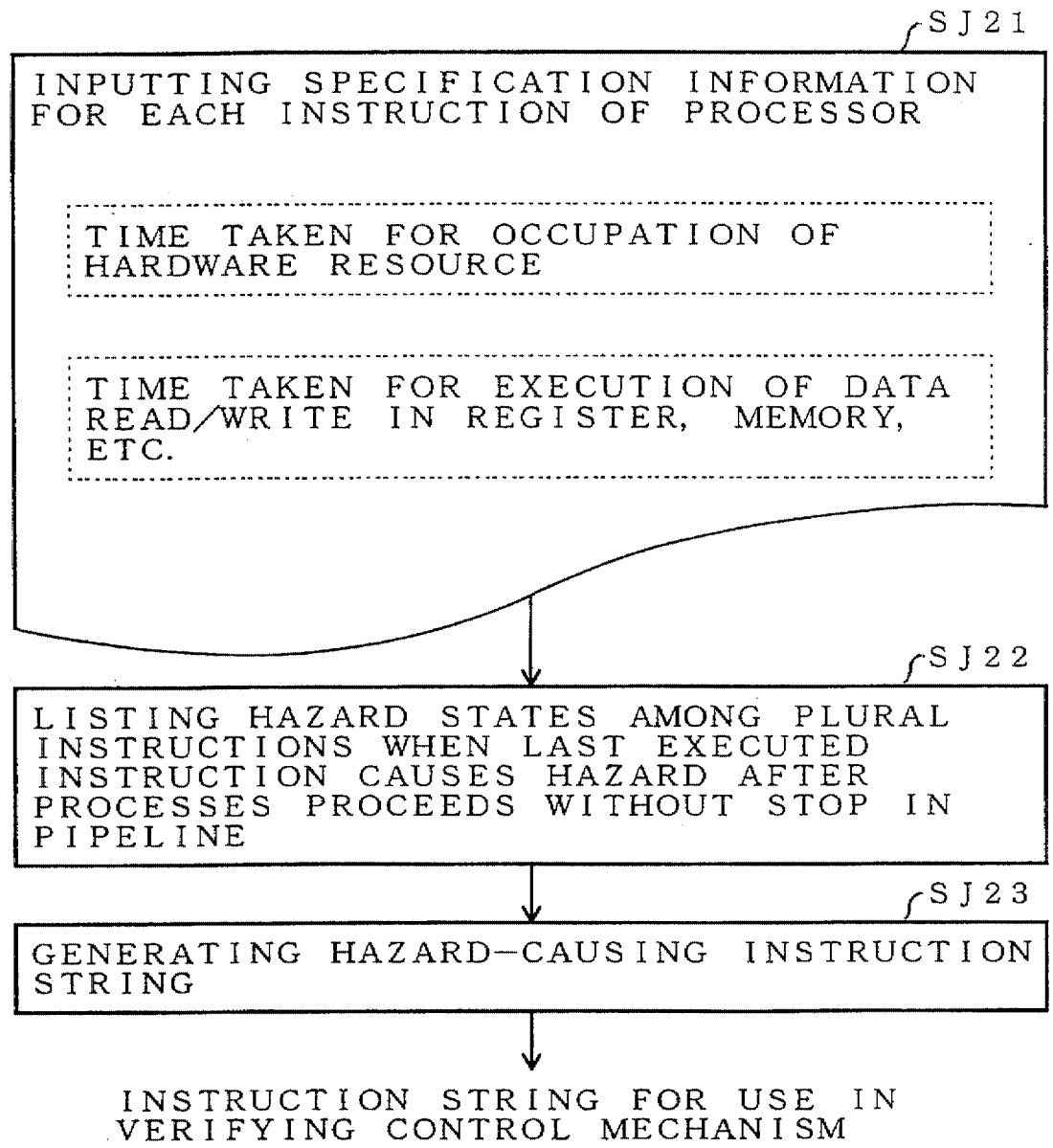
FIG. 26 is a flowchart showing the operation performed in the second embodiment.

The configurational difference between the second embodiment and the first embodiment is that the hazard state listing unit 2 is replaced with the after-process hazard state listing unit 23 in the second embodiment. FIG. 26 shows the operational flowchart of the second embodiment. The listing unit 23 performs the process in step SJ21. The processes other than those in step SJ21 are the same as the processes according to the first embodiment show in the flowchart in FIG. 12. That is, the processes in steps SJ21 and SJ23 are the same as those in steps SJ1 and SJ3 in the flowchart shown in FIG. 12.

The listing unit 21 lists data dependence states and conflict states for specific resources among a plurality of instructions as a result of which a hazard is generated after all instructions have been executed in a pipeline process without insertion of a stall cycle in a pipeline of the processor 7 (step SJ22). These states correspond to those numbered as shown in FIGS. 13A, 13B, 14, 15, and 16.

The instruction string generating unit 3 generates an instruction string corresponding to each of the above described states (step SJ23).

Figure 27:
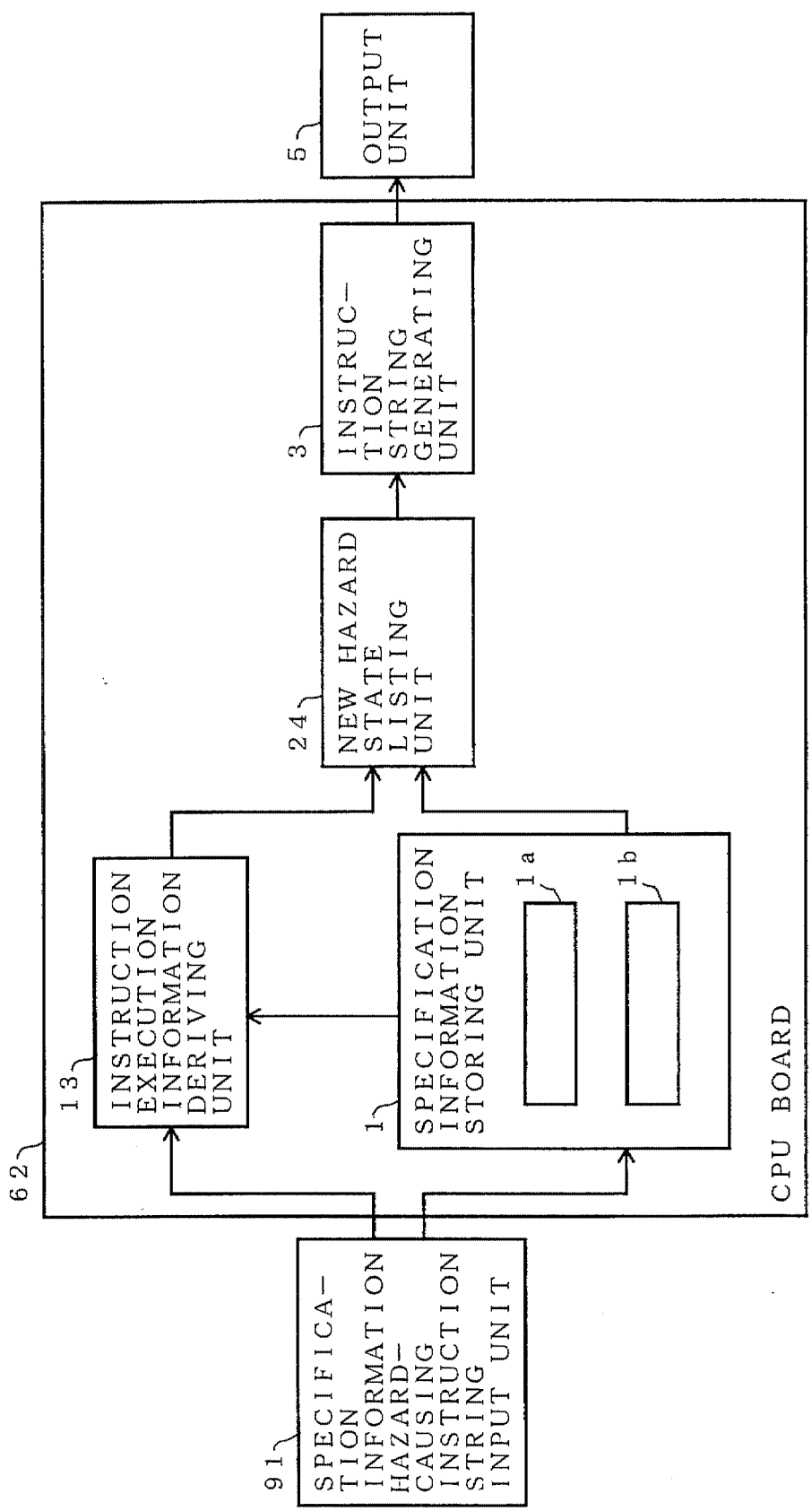
FIG. 27 is a block diagram of the device for automatically generating an instruction string for use in verifying the operation of the pipeline control mechanism of the processor shown in FIG. 7 according to the third embodiment of the present invention.

Furthermore, FIG. 27 is the block diagrams of the device for automatically generating an instruction string for use in verifying the control mechanism according to the third embodiment of the present invention.

A specification information hazard-causing instruction string input unit 91 comprises a keyboard, etc. and inputs to a CPU board 62 information about an instruction string causing each hazard in addition to the specification information associated with the pipeline process of each instruction.

The CPU board 62 comprises a specification information storing unit 1 similar to those in the above described first and second embodiments, the instruction execution information deriving unit 13, a new hazard state listing unit 24, and the instruction string generating unit 3 similar to those in the first and second embodiments.

The instruction execution information deriving unit 13 generates, based on an instruction string which is input from the input unit 91 and causes a hazard and on the specification information (shown in FIG. 12) stored in the specification information storing unit 1, a hazard pipeline process information (instruction execution information) for the hazard causing instruction string used by the processor 7.

The information about the hazard-causing instruction string can be obtained from, for example, the above described first and second embodiments.

If an instruction string FMUL-*-LOAD, which is numbered 2 in FIG. 16 and causes a structural hazard in a WB stage, is entered, instruction execution information shown in FIG. 29A is generated based on the information in the list 108h relating to the WB unit 7h in the hardware resource occupation information list 107 stored in area 1a of the specification information storing unit 1. That is, a 1-clock stall cycle is inserted after the MEM stage as the execution information about the LOAD instruction. Thus, cleared is the structural hazard caused by the conflict for the WB unit 7h at time 7. FIG. 29B shows the new generated instruction execution information about the execution time at which data are read and written for hardware resources and registers (GPR). The instruction execution information deriving unit 13 generates instruction execution information for instruction strings causing structural and data hazards in addition to the above described FMUL-*-LOAD. A stall cycle is inserted to clear a hazard, and the processor 7 actually executes instructions based on the generated information which is output to the new hazard state listing unit 24.

A hazard clearance control such as insertion of a stall cycle is made based on the instruction string execution information received from the instruction execution information deriving unit 13 and the specification information (FIGS. 10 and 11), which is received from the specification information storing unit 1, about each instruction executed by the processor 7. After the control, the new hazard state listing unit 24 lists information about the states of instruction strings which cause a new hazard.

The instruction string generating unit 3 generates a hazard-causing instruction string based on the hazard state information received from the new hazard state listing unit 24.

Figure 28:
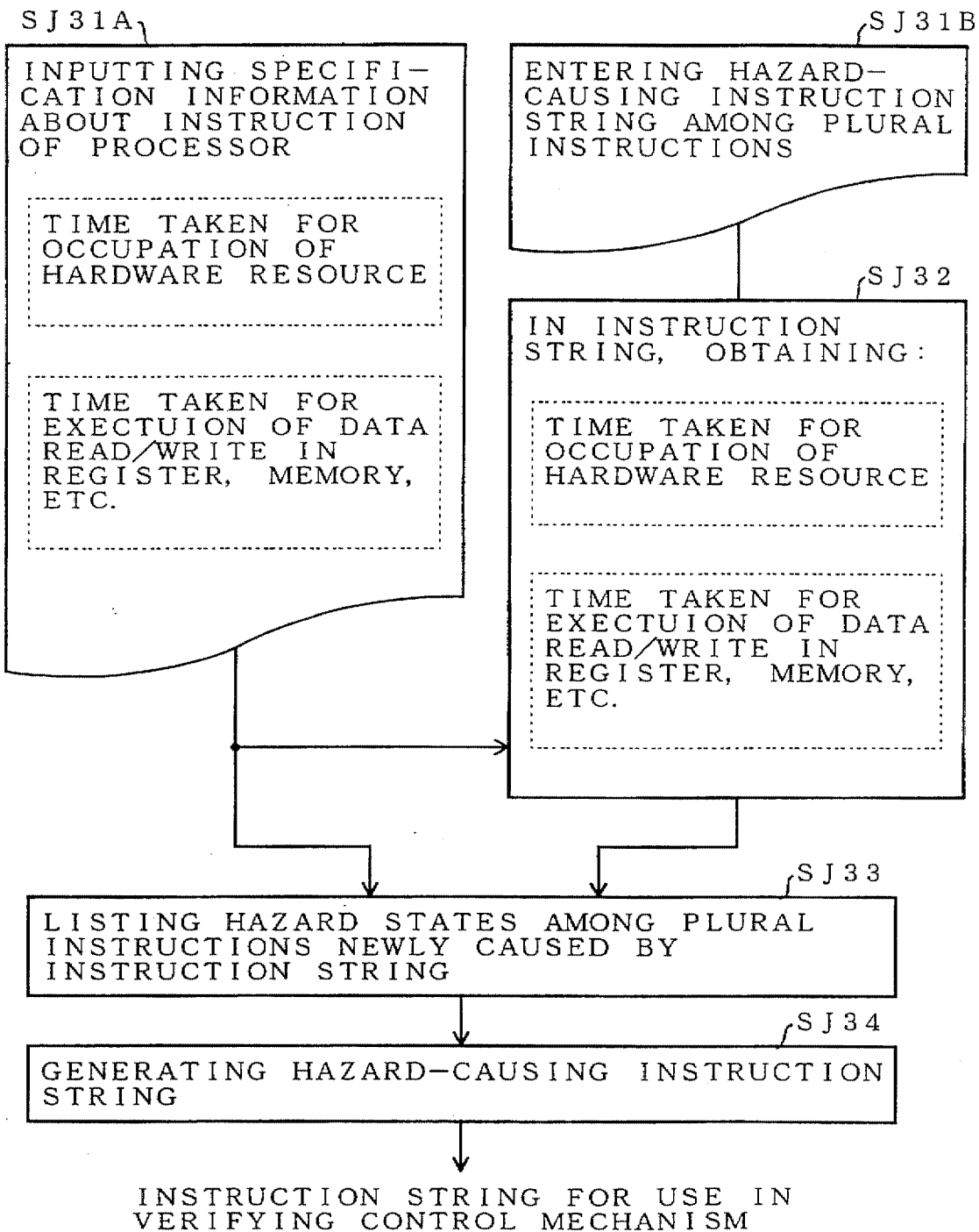
FIG. 28 is a flowchart showing the operation of the third embodiment.

FIG. 28 is the flowchart showing the operation according to the third embodiment with the above described configuration.

The specification information A relating to the time taken for occupying hardware resources and the specification information B relating to the time taken for reading and writing data from and to a register, a memory, etc. are entered by the specification information hazard-causing instruction string input unit 91 for each instruction executed by the processor 7. If the specification information A and B are entered, they are respectively stored in areas 1a and 1b of the specification information storing unit 1 (step SJ31A). The process in step SJ31A is the same as that in step SJ1 shown by the flowchart in FIG. 12.

The information about instruction strings causing structural and data hazards among a plurality of instructions input by the input unit 91 is input and stored in the instruction execution information deriving unit 13 (step SJ31B).

The deriving unit 13 receives from the specification information storing unit 1 the specification information A and B about each instruction forming part of the stored hazard-causing instruction string. Then, it generates execution information (instruction execution information) about a pipeline process for which a hazard is cleared by inserting a stall cycle, etc. in the above described hazard-causing instruction string actually executed by the processor 7. (step SJ32).

Thus, the operation shown in FIG. 29A is performed on the instruction string FMUL-*-LOAD which is involved in conflict for resources at the WB stage. That is, in the pipeline process performed on the LOAD instruction, a 1-clock stall cycle is inserted after the MEM stage. As a result, generated is execution information (instruction execution information) about a hazard-causing instruction string actually executed by the processor 7 as shown in FIG. 29B.

Then, the new hazard state listing unit 24 lists information about the states of instruction strings which cause a new hazard after the execution of the above described hazard-cleared instruction string based on the actual instruction execution information about the hazard-causing instruction string generated by the instruction execution information deriving unit 13 in step SJ32, and on the specification information A and B about each instruction forming part of the hazard-causing instruction string stored in the specification information storing unit 1 in step SJ31A (step SJ33).

FIG. 30 shows an example of a state listed in the process in step SJ33. In the example, after the instruction string FMUL-*-LOAD has been controlled such that a hazard can be cleared, a structural hazard is caused by a conflict for a resource when a LOAD, FADD, or ADD instruction is executed after the LOAD instruction. In the example, a structural hazard is caused by a conflict for a resource in the WB stage.

The instruction string generating unit 3 receives from the new hazard state listing unit 24 the information indicating a hazard state obtained in step SJ33, and generates a hazard-state-causing instruction string (step SJ34).

Thus, FMUL-*-LOAD-LOAD, FMUL-*-LOAD-FADD, AND FMUL-*-LOAD-*-ADD instruction strings are generated according to the information about each of the hazard states 1, 2, and 3 as shown in FIG. 30.

Figure 31:
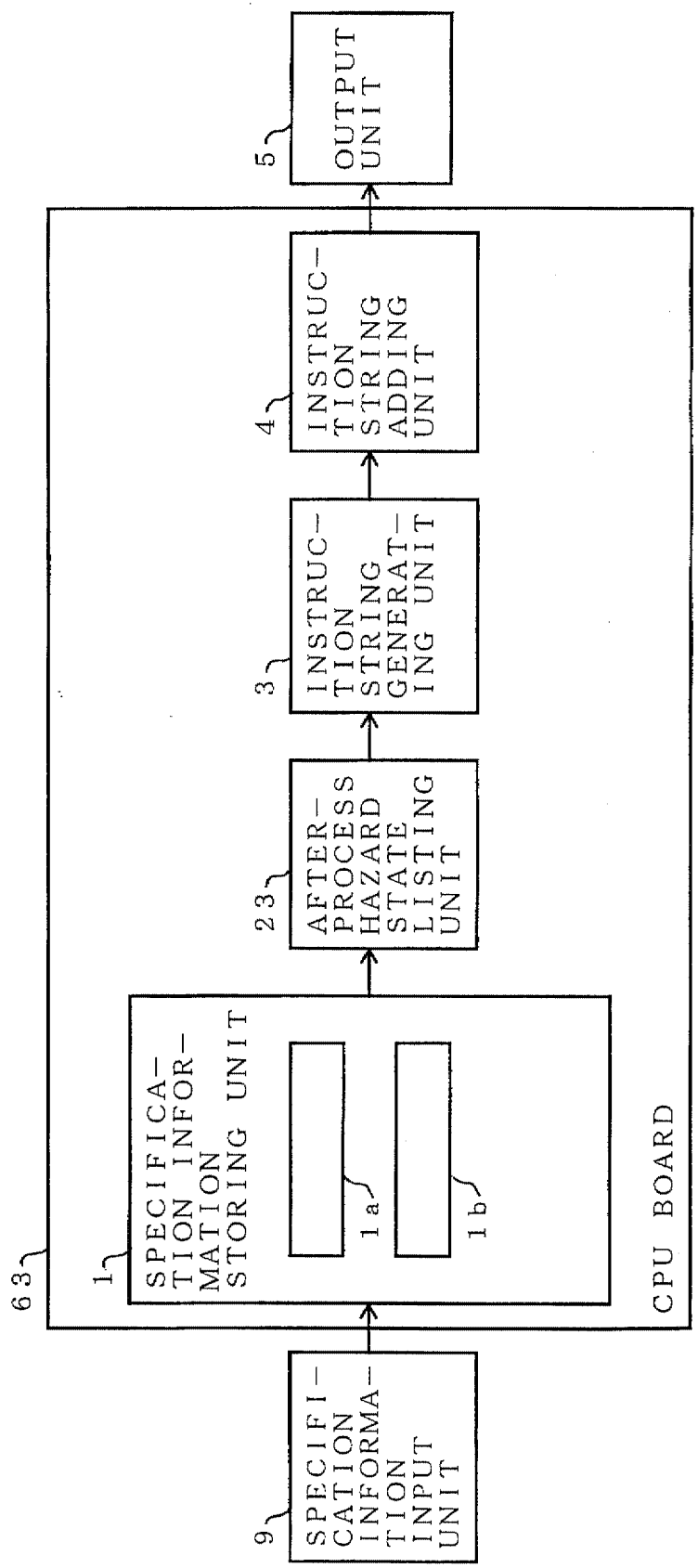
FIG. 31 is a block diagram of the device for automatically generating an instruction string for use in verifying the operation of the pipeline control mechanism of the processor shown in FIG. 7 according to the fourth embodiment of the present invention.

FIG. 31 is the block diagram of the device for generating an instruction string for use in verifying the control mechanism according to the fourth embodiment of the present invention. In FIG. 31, a block also shown in the second embodiment shown in FIG. 25 is assigned a corresponding number.

In addition to the specification information storing unit 1, the after-process hazard state listing unit 23, and the instruction string generating unit 3, the CPU board 63 in the fourth embodiment comprises a instruction string adding unit 4 for adding a new instruction string such as an initial state set instruction before or after the instruction strings generated by the instruction string generating unit 3.

When the instruction string adding unit receives a generated instruction string from the instruction string generating unit 3, it adds in response to the instruction string an instruction string to set an initial state of the processor 7 (an initial state set instruction string) and an instruction string to store an end state of the processor 7 (an end state store instruction string) after the execution of the input instruction.

Figure 32:
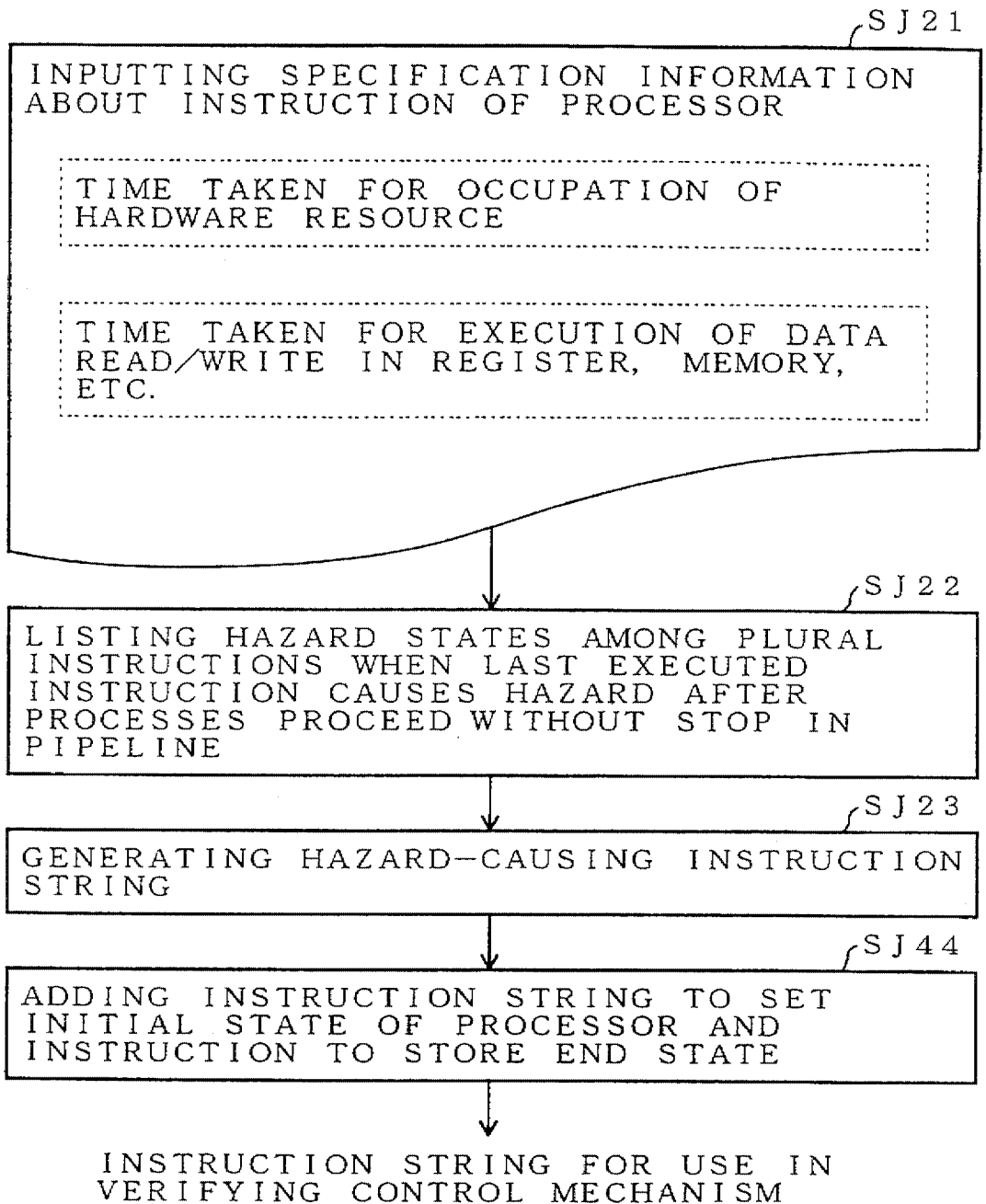
FIG. 32 is a flowchart showing the operation of the fourth embodiment.

FIG. 32 is the flowchart showing the operation according to the fourth embodiment.

In the fourth embodiment, the processes in steps SJ21, SJ22, and SJ23 are sequentially performed as in the second embodiment. Then, in step SJ44, the instruction string adding unit 4 adds the initial state set instruction string and the end state store instruction string respectively before and after the instruction string which is generated by the instruction string generating unit 3 and causes a hazard only after the execution of an instruction in the last step. For example, if the instruction string generating unit 3 generates instruction strings 1 and 2 shown in FIG. 14, the initial state set instruction string is as follows. Instruction strings 1 and 2 cause a data hazard If two ADD instructions simultaneously read/write data from and to the same GPR.

In this case, added as the initial state set instruction string is an instruction string to set an initial value for all GPRs used by the two ADD instructions.

On the other hand, the end state store instruction string stores in, for example, a memory a value of the GPR for storing an operation result of the second ADD instruction.

Thus, by referring to the stored value, the pipeline control mechanism 7a can check whether or not a correct control has been performed in the execution of instruction strings 1 and 2.

Figure 33:
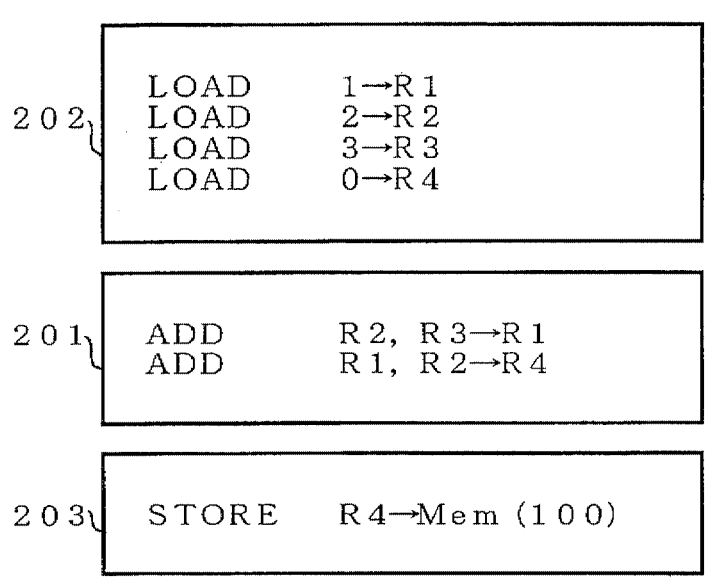
FIG. 33 shows an example the instruction string generated by the initial state setting instruction string adding unit according to the fourth embodiment.

FIG. 33 shows examples of an initial state set instruction string 201 and an end state store instruction string 203 to be added to an instruction string ADD-ADD 202 of number 1 by the instruction string adding unit 4. In FIG. 33, R1, R2, R3, and R4 refer to different GPRs. Mem(100) indicates address 100 of the memory. The example in FIG. 33 shows as a practical example of an ADD-ADD instruction string 201:

ADD R2, R3→R1 (R2+R3→R1)

ADD R1, R2→R4 (R1+R2→R4)

In the instruction example, the first ADD instruction writes an operation result to register R1 at the WB stage, and the second ADD instruction reads a value from register R1 at the ID stage. Thus, register R1 is not accessed in a correct order, thereby causing a RAW hazard.

To the ADD-ADD instruction string 101, the following instruction string 102 is added as an initial state set instruction string.

LOAD 1→R1
LOAD 2→R2
LOAD 3→R3
LOAD 0→R4

By executing the instruction string, initial values 1, 2, 3, and 0 are set respectively in registers R1, R2, R3, and R4.

Therefore, if the pipeline process for the instruction string 201 in the processor 7 is controlled by the pipeline control mechanism 7a such that a hazard can be successfully cleared, that is, if the pipeline control mechanism 7a controls the instruction string 201 such that it can be correctly executed using the pipeline interlock function, then register R4 stores 7 after the execution of the instruction string 101. On the other hand, if the second ADD instruction performs an operation using a value (1) set in register R1 by the execution of the instruction string 202, then register R4 stores 3.

Thus, to verify that register R4 stores 7, that is, to verify that the second ADD instruction has been executed correctly, the following instruction to store at address 100 in the memory the value stored in register R4 is added as the end state store instruction string 203 to the end of the instruction string 101.

STORE R4→Mem (100)

Accordingly, after the execution of the instruction string 203, the operation of the pipeline control mechanism 7a can be verified by checking whether or not the value 7 is stored at address 100 in the memory.

The instruction string adding unit 4 preliminarily enters such an initial state set instruction string and an end state store instruction string in a data base for each type of hazard state. Then, it selects an initial state set instruction string and an end state set instruction string corresponding to a hazard-causing instruction string received from the data base, and adds them before and after the input instruction string.

When the two instruction strings are added, appropriate amendments should be made to their operands (for example, a register address).

Thus, when the operation of the pipeline control mechanism 7a is verified in a design stage through a logical simulation, the internal state (values of the registers and memories) of the processor 7 is directly initialized externally by referring to the initial state set instruction string. Then, executed is only an instruction string which causes a hazard state, and the execution result is directly observed externally by referring to the end state store instruction string.

When the operation of the processor 7 is tested, executed are not only the instruction string which causes the hazard state but also the initial state set instruction string and the end state store instruction string before and after the instruction string. That is, the processor 7 executes the instruction string generated by the initial state set instruction string adding unit 4. Thus, the operation of the processor 7 can also be tested even when the internal state of the processor 7 cannot be directly controlled or observed externally.

FIG. 34 is the block diagram of the device for automatically generating an instruction string for use in verifying the control mechanism of the processor 7 according to the fifth embodiment of the present invention.

The present embodiment is a combination of the second embodiment shown in FIG. 25 and the third embodiment shown in FIG. 27. A block also shown in FIGS. 25 and 27 is assigned the corresponding number.

The present embodiment is segmented into the first system comprising the specification information input unit 9, the specification information storing unit 1, the after-process hazard state listing unit 23, the instruction string generating unit 32, and the output unit 5, and the second system comprising the specification information storing unit 1, the instruction execution information deriving unit 13, the new hazard state listing unit 24, the instruction string generating unit 32, and the output unit 5.

As in the second embodiment, the first system generates an instruction string which causes a hazard when the last instruction is executed. In the second system, the instruction execution information deriving unit 13 first obtains instruction execution information (pipeline process information with a stall cycle inserted) for use by the processor 7 in controlling a hazard-state-causing instruction string generated by the first system such that no hazard is generated in an actual execution of an instruction. Then, The new hazard state listing unit 24 refers to the specification information stored by the specification information storing unit 1, adds to the end of an instruction string provided with a pipeline, interlock, etc. an instruction which causes a hazard after the execution of the instruction string, and lists information about a new hazard state caused among a plurality of instructions. The instruction string generating unit 32 receives the hazard state information, generates an instruction string causing the hazard state, and outputs to the output unit 5 the instruction string as an instruction string for use in verifying the control mechanism.

In the first system, the instruction string generating unit 32 functions as the instruction string generating unit 3 of the second embodiment. In the second system, it functions as the instruction string generating unit 3 of the third embodiment.

In the second system, the hazard-causing instruction string generated by the instruction string generating unit 32 is fed back to the instruction execution information deriving unit 13. Thus, the instruction execution information deriving unit 13 obtains pipeline process information (instruction execution information) with a stall cycle inserted for use by the processor 7 in actually executing the input instruction string. The information is output to the new hazard state listing unit 24. The new hazard state listing unit 24 adds a new instruction to the above described input instruction string, and lists conflict states among a plurality of instructions which cause a new hazard after the execution of the input instruction string. The instruction string generating unit 32 generates an instruction string corresponding to the listed conflict states, outputs the instruction string as an instruction string for use in verifying the control mechanism to the output unit 5 and the instruction execution information deriving unit 13.

Thus, in the second system, the feedback process is repeatedly performed for a specified number of times through the instruction execution information deriving unit 13, the new hazard state listing unit 24, the instruction string generating unit 32, and the instruction execution information deriving unit 13 in this order. Thus, instruction strings for use in verifying the control mechanism of the processor 7 are automatically generated as covering a number of hazard-causing states with serially increased step numbers.

Figure 35:
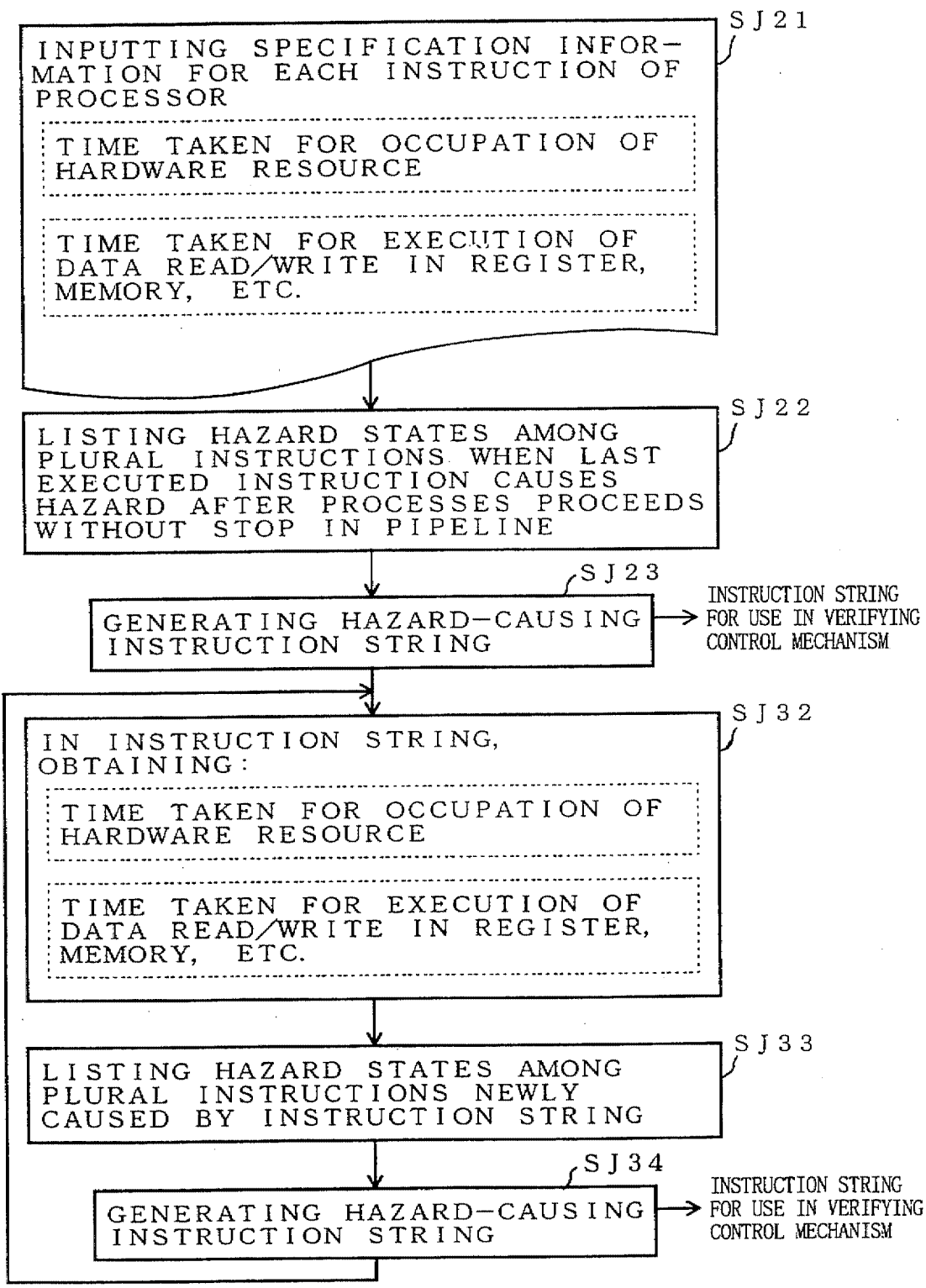
FIG. 35 is a flowchart showing the operation performed according to the fifth embodiment.

The flowchart shown in FIG. 35 shows the operation of the fifth embodiment with the above described configuration. In FIG. 35, a process also shown in the flowchart showing the operation according to the second embodiment shown in FIG. 26 and in the flowchart showing the operation according to the third embodiment shown in FIG. 28 is assigned the corresponding number.

In the flowchart shown in FIG. 35, the processes in steps SJ21 through SJ23 are the same as those according to the second embodiment. A plurality of instruction strings for use in verifying the control mechanism the last instruction of which causes a hazard are generated based on the hardware resource occupation time information (specification information A stored in area 1a) received from the specification information input unit 9 about each stage in a pipeline process and information (specification information B stored in area 1b) about the time at which data are written and read to and from a register, a memory, etc.

The processes in steps SJ32 through SJ34 form a loop process. After pipeline process information is generated in step SJ32 such that a hazard can be cleared for a hazard-causing instruction string generated in step SJ23. In step SJ33, a new instruction is added after the above described instruction string according to the pipeline process information and the specification information A and B stored in the specification information storing unit 1. As a result, listed is information about the states in which new hazards are generated. Then, in step SJ34, the instruction string generating unit 32 generates an instruction string for each of the listed hazard states, and outputs the instruction string to the output unit 5 as an instruction string for use in verifying the control mechanism.

The instruction string generated in step SJ34 is returned as a hazard-causing instruction string to the process in step SJ32, and the processes in steps SJ32 through SJ34 are repeated. Thus, a new instruction string for use in verifying the control mechanism is generated by adding a new instruction to the above mentioned instruction string. Then, the instruction string for use in verifying the control mechanism is entered as a hazard-causing instruction string in step SJ32.

Repeating the loop process in steps SJ32 through SJ34 a predetermined number of times generates a number of long-step instruction strings for use in verifying the control mechanism which may cause hazards a plurality of times and require pipeline interlock control.

Figure 36:
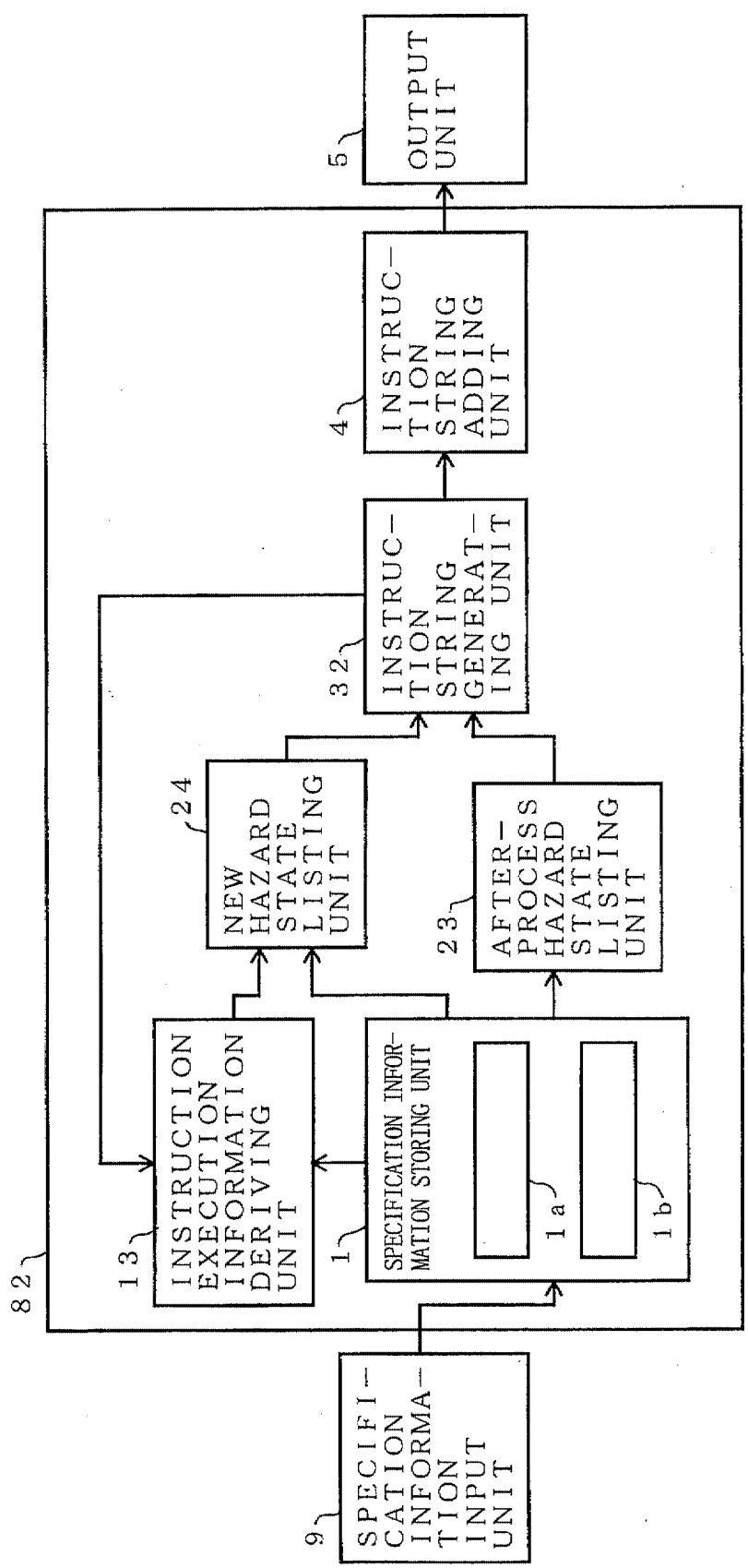
FIG. 36 is a block diagram of the device for automatically generating an instruction string for use in verifying the operation of the pipeline control mechanism of the processor shown in FIG. 7 according to the sixth embodiment of the present invention.

FIG. 36 is the block diagram of the device for automatically generating the instruction string for use in verifying the control mechanism of the processor 7 according to the sixth embodiment of the present invention.

The sixth embodiment is obtained by adding the instruction string adding unit 4 to the fifth embodiment. The instruction string adding unit 4 is provided between the instruction string generating unit 32 and the output unit 5. An initial state set instruction string of the processor 7 and an end state store instruction string of the processor 7 are added respectively before and after the instruction strings generated by the instruction string generating unit 32. The new instruction string with the above described instruction strings added is output to the output unit 5 as an instruction string for use in verifying the control mechanism of the processor 7. As in the fourth embodiment, the initial state set instruction string and the end state store instruction string are used to check whether or not the pipeline control mechanism 7a correctly functions such that a data hazard can be cleared. They also can be used to test the operation of the processor 7.

Figure 37:
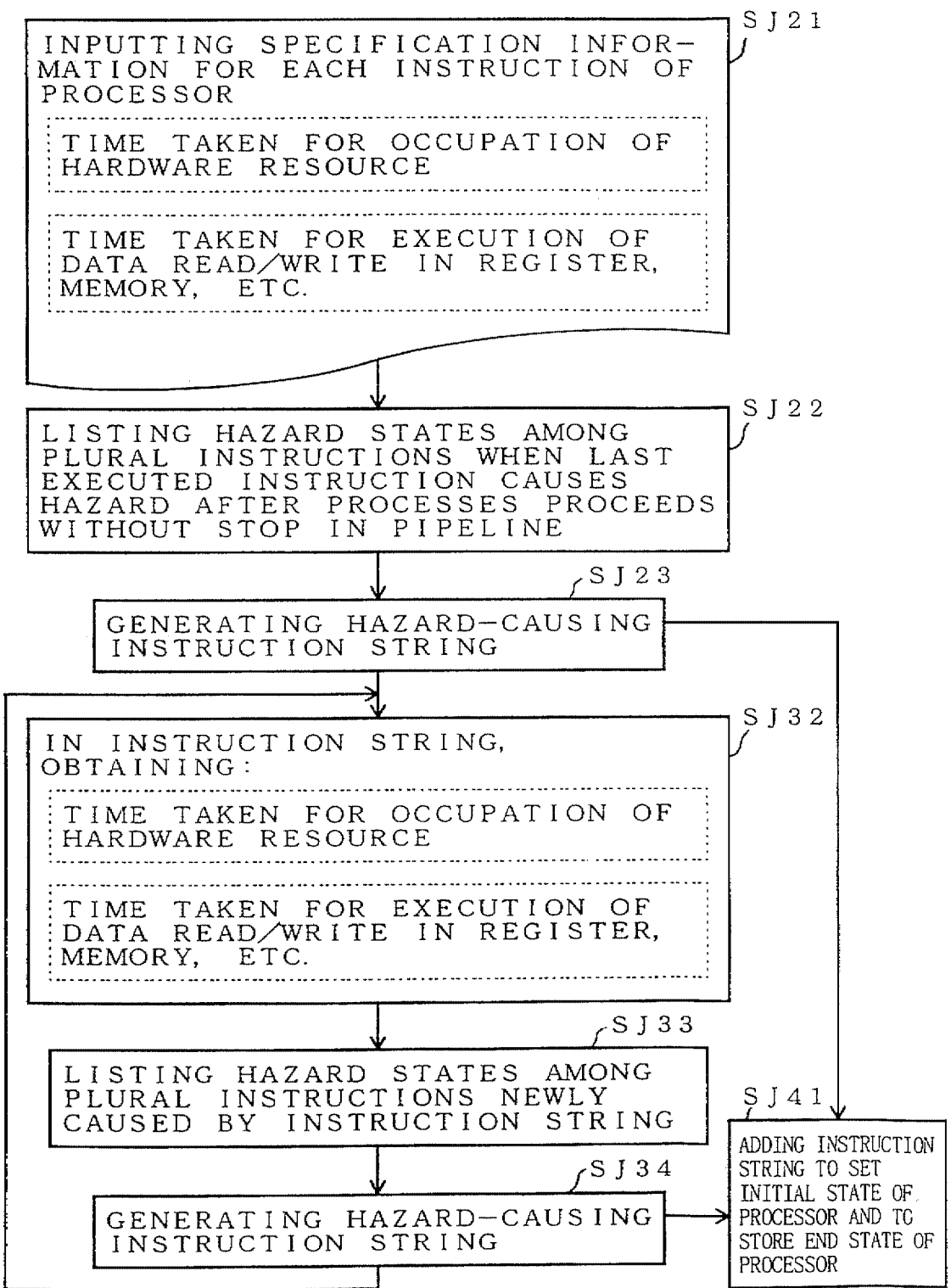
FIG. 37 is a flowchart showing the operation performed according to the sixth embodiment.

FIG. 37 is the flowchart showing the operation according to the sixth embodiment with the above described configuration.

In FIG. 37, a step also shown in the operational flowchart according to the fifth embodiment in FIG. 33 is assigned a corresponding number. The operation according to the present embodiment is different from that according to the fifth embodiment in that the initial state set instruction string and the end state store instruction string are added to the instruction string generated in step SJ23 or SJ34 (step SJ41).

Figure 38:
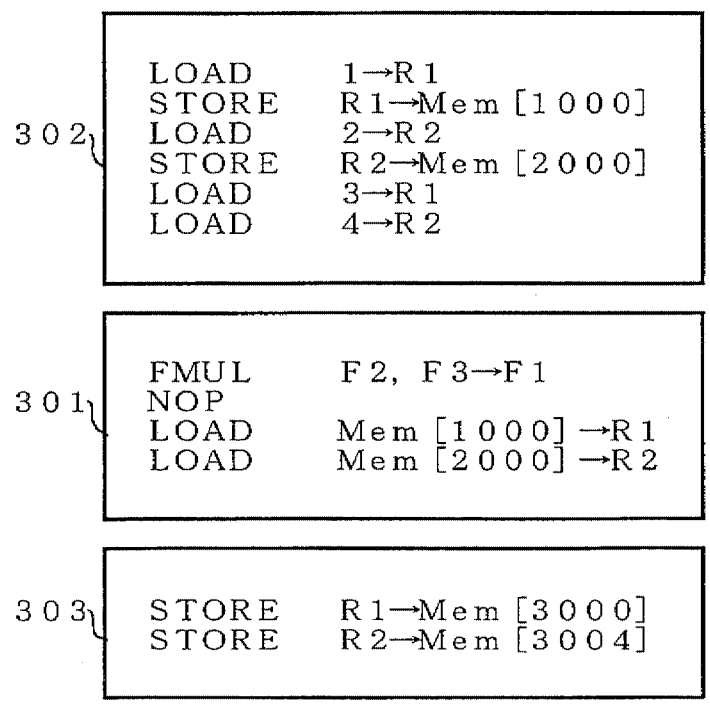
FIG. 38 shows an example of an instruction string generated by the units for adding the initial state setting instruction string, etc. according to the sixth embodiment.

FIG. 38 shows an example of a practical process in step SJ41.

In FIG. 38, instruction string 301 is a hazard-causing instruction string generated in step SJ34. In this case, a structural hazard is caused by a conflict for the WB unit 7h at time 8 as shown in FIG. 28. Therefore, a GPR (registers R1 and R2 in this case) is set to a wrong value if the pipeline control mechanism 7a does not perform pipeline interlock control in which a stall cycle is inserted after the MEM stage during the execution of the LOAD instruction in the fourth step of the instruction string.

Accordingly, an initial state set instruction string 302 and an end state store instruction string 303 are added respectively before and after instruction string 301. In instruction string 302, 1 and 2 are set as initial values respectively at addresses 1000 and 2000 in the memory as operands of the two LOAD instructions in instruction string 301. Then, executing the two LOAD instructions sets values 3 and 4 respectively in registers R1 and R2 which store the values respectively at addresses 1000 and 2000 in the memory.

On the other hand, instruction string 303 contains two STORE instructions which respectively store at addresses 3000 and 4000 in the memory the values in registers R1 and R2, that is, the execution results of the two LOAD instructions in instruction string 301. Executing the two LOAD instructions causes a structural hazard for the WB unit 7h and a WAW hazard from output dependence.

Therefore, the contents of addresses 3000 and 3004 in the memory should be confirmed after the execution of instruction string 303 so as to check whether or not the pipeline control mechanism 7a correctly functions. In the present embodiment, the function of the pipeline control mechanism 7a can be verified if 1 and 2 are respectively stored at addresses 3000 and 3004 in the memory. On the other hand, the function of the pipeline control mechanism 7h can be verified if 3 or 4 is stored at address 3000 or 4000 in the memory.

In the present embodiment, the specification information about an instruction executed by the processor 7 is given about the instruction shown in FIG. 8. However, the present invention automatically generates various instruction strings for use in verifying the operation of the pipeline control mechanism 7a using specification about arithmetic operation instructions such as SUB, AND, OR, etc. and data transfer instructions, for example, STORE in addition to the instructions shown in FIG. 8. Furthermore, the configuration of the applicable pipeline is not limited to that shown in FIG. 7. That is, also applicable are a configuration according to a super-scalar method in which a plurality of IF units are provided and a configuration according to a super-pipeline method in which a pipeline stage is divided into a plurality of further smaller sections. Additionally applicable is a pipeline provided with one FPU unit or with three or more FPU units.

Thus, the present embodiment automatically generates a hazard-causing instruction string based on the specification information relating to the time taken for the occupation of each unit for performing a pipeline process on each instruction in each stage and relating to the time taken for reads and writes of data in registers, memories, etc.

According to the present embodiment, a hazard-causing instruction string is automatically generated based on the specification information by listing all conflict states among a plurality of hazard-causing instructions. Accordingly, all instruction strings which cause hazards when the processor 7 actually executes a program can be generated in a short time, thereby verifying the operation of the pipeline control mechanism with high reliability. Furthermore, since a hazard-causing instruction string can be generated in the smallest possible number of steps, the operation of the pipeline control mechanism can be efficiently verified within a short time.

The pipeline of the processor 7 according to the present embodiment has a 2-clock (FADD) or 4-clock (FMUL) FPU stage differently from the other stages. Thus, according to the present embodiment, generated is an instruction string for use in verifying the operation of the control mechanism of a pipeline in which each pipeline stage can have the number of clocks different from other pipeline stages. Furthermore, as in the FPU stage, a plurality of similar pipeline stages can be provided in a pipeline of a processor for which an instruction string for use in verifying the operation of the pipeline control mechanism can be generated. Furthermore, a hazard-causing instruction string can be generated for a processor which supports a plurality of instructions having different pipeline stage configurations.

The preferred embodiments described in this specification are shown as examples, and it is obvious that the present invention is not limited to these applications. The scope of the invention is defined in the attached claims, and all variations of the claimed inventions are contained in the present invention.

What is claimed is:

1. An automatic instruction string generating method for verifying operations of a pipeline control mechanism of a processor, comprising the steps of:

inputting specification information about a pipeline process of an instruction to be executed by the processor, the specification information including time for the processor to access hardware resources for the instruction;

listing, according to the specification information, states in which hazards are caused among a plurality of instructions in time order; and generating an instruction string corresponding to each of the states listed by said listing step.

2. The automatic instruction string generating method according to claim 1, further comprising a step of:

providing said processor with pipeline stages, each of the pipeline stages completing the pipeline process with a number of clocks different from other pipeline stages.

3. The automatic instruction string generating method according to claim 1, further comprising a step of:

providing said processor so that said processor supports an instruction to be processed through a path different from that of other instructions in a pipeline of said processor.

4. The automatic instruction string generating method according to claim 1, further comprising a step of:

providing said processor with a plurality of similar pipeline stages.

5. An automatic instruction string generating method for verifying operations of a pipeline control mechanism of a processor, comprising the steps of:

inputting specification information about a pipeline process of an instruction to be executed by the processor, the specification information including time for the processor to access hardware resources for the instruction;

listing, according to the specification information, states in which hazards are caused between a last started instruction and an instruction preceding the last started instruction by execution of the last started instruction after the pipeline process has processed a pipeline of the processor without a stop, the state including information on a series of instructions in time order that causes the hazards; and generating an instruction string corresponding to each of the states listed by said listing step.

6. The automatic instruction string generating method according to claim 5, further comprising a step of:

providing said processor with pipeline stages, each of the pipeline stages completing the pipeline process with a number of clocks different from other pipeline stages.

7. The automatic instruction string generating method according to claim 5, further comprising a step of:

providing said processor so that said processor supports an instruction to be processed through a path different from that of other instructions in a pipeline of said processor.

8. The automatic instruction string generating method according to claim 5, further comprising a step of:

providing said processor with a plurality of similar pipeline stages.

9. An automatic instruction string generating method for verifying operations of a pipeline control mechanism of a processor, comprising the steps of:

inputting specification information about a pipeline process of an instruction to be executed by the processor, the specification information including time for the processor to access hardware resources for the instruction;

inputting an instruction string in which a hazard is caused among a plurality of instructions when the processor executes the instruction;

obtaining pipeline process information output when the pipeline control mechanism of the processor controls the instruction string in which the hazard was caused such that the hazard can be cleared;

listing states in which new hazards are caused by executing a new instruction by the processor according to the pipeline process information and the specification information after execution of the instruction string in which the hazard was caused, the states including information on a series of instructions in time order that causes the new hazards; and generating an instruction string corresponding to each of the states listed by said listing step.

10. The automatic instruction string generating method according to claim 9, further comprising a step of:

providing said processor with pipeline stages, each of the pipeline stages completing the pipeline process with a number of clocks different from other pipeline stages.

11. The automatic instruction string generating method according to claim 9, further comprising a step of:

providing said processor so that said processor supports an instruction to be processed through a path different from that of other instructions in the pipeline.

12. The automatic instruction string generating method according to claim 9, further comprising a step of:

providing said processor with a plurality of similar pipeline stages.

13. An automatic instruction string generating method for verifying operations of a pipeline control mechanism of a processor, comprising the steps of:

inputting specification information about a pipeline process of an instruction to be executed by the processor;

listing, according to the specification information, states in which hazards are caused among a plurality of instructions;

generating an instruction string corresponding to each of the states listed by said listing step;

adding before the instruction string an instruction to initialize an internal state of the processor into a state required to verify an operation of the pipeline control mechanism; and adding after the instruction string corresponding to each of the states listed by said listing step an instruction to store in specified storage means data required to verify the operation of the pipeline control mechanism.

14. An automatic instruction string generating method for verifying operations of a pipeline control mechanism of a processor, comprising the steps of:

inputting specification information about a pipeline process of an instruction to be executed by the processor;

listing, according to the specification information, states in which hazards are caused between a last started instruction and an instruction preceding the last started instruction by execution of the last started instruction after the pipeline process has processed a pipeline of the processor without a stop;

generating an instruction string corresponding to each of the states listed by said listing step;

adding before the instruction string an instruction to initialize an internal state of the processor into a state required to verify an operation of the pipeline control mechanism; and adding after the instruction string corresponding to each of the states listed by said listing step an instruction to store in specified storage means data required to verify the operation of the pipeline control mechanism.

15. An automatic instruction string generating method for verifying operations of a pipeline control mechanism of a processor, comprising the steps of:

inputting specification information about a pipeline process of an instruction to be executed by the processor;

inputting an instruction string in which a hazard is caused among a plurality of instructions when the processor executes the instruction;

obtaining pipeline process information output when the pipeline control mechanism of the processor controls the instruction string in which the hazard was caused such that the hazard can be cleared;

listing states in which new hazards are caused by executing a new instructions by the processor according to the pipeline process information and the specification information after execution of the instruction string in which the hazard was caused;

generating an instruction string corresponding to each of the states listed by said listing step;

adding before the instruction string an instruction to initialize an internal state of the processor into a state required to verify an operation of the pipeline control mechanism; and adding after the instruction string corresponding to each of the states listed by said listing step an instruction to store in specified storage means data required to verify the operation of the pipeline control mechanism.

16. An automatic instruction string generating device for verifying operations of a pipeline control mechanism of a processor, comprising:

specification information storing means for inputting and storing specification information about a pipeline process of an instruction to be executed by the processor, the specification information including time for the processor to access hardware resources for the instruction;

hazard state listing means for listing, according to the specification information stored in said specification information storing means, states in which hazards are caused among a plurality of instructions in time order; and instruction string generating means for generating an instruction string corresponding to each of the states listed by said hazard state listing means.

17. The automatic instruction string generating device according to claim 16, wherein said processor is provided with pipeline stages, each of the pipeline stages completing the pipeline process with a number of clocks different from other pipeline stages.

18. The automatic instruction string generating device according to claim 16, wherein said processor supports an instruction to be processed through a path different from that of other instructions in a pipeline of said processor.

19. The automatic instruction string generating device according to claim 16, wherein said processor is provided with a plurality of similar pipeline stages.

20. An automatic instruction string generating device for verifying operations of a pipeline control mechanism of a processor, comprising:

specification information storing means for inputting and storing specification information about a pipeline process of an instruction to be executed by the processor, the specification information including time for the processor to access hardware resources for the instruction;

hazard state listing means for listing, according to the specification information stored in said specification information storing means, states in which hazards are caused between a last started instruction and an instruction preceding the last started instruction by execution of the last started instruction after the pipeline process has processed a pipeline of the processor without a stop, the states including information on a series of instructions in time order that causes the hazards; and instruction string generating means for generating an instruction string corresponding to each of the states listed by said hazard state listing means.

21. An automatic instruction string generating device for verifying operations of a pipeline control mechanism of a processor; comprising:

specification information storing means for inputting and storing specification information about a pipeline process of an instruction to be executed by the processor, the specification information including time for the processor for access hardware resources for the instruction;

hazard generation instruction string input means for inputting an instruction string in which a hazard is caused among a plurality of instructions when the processor executes the instruction;

instruction execution information obtaining means for obtaining pipeline process information output when the pipeline control mechanism of the processor controls the instruction string in which the hazard is caused and which is input by said hazard generation instruction string input means such that the hazard can be cleared;

hazard state listing means for listing states in which new hazards are caused by executing a new instructions by the processor according to the pipeline process information and the specification information after execution of the instruction string in which the hazard was caused, the states including information on a series of instructions in time order that causes the hazard; and instruction string generating means for generating an instruction string corresponding to each of the states listed by said hazard state listing means.

22. An automatic instruction string generating device for verifying operations of a pipeline control mechanism of a processor, comprising:

specification information storing means for inputting and storing specification information about a pipeline process of an instruction to be executed by the processor;

hazard state listing means for listing, according to the specification information stored in said specification information storing means, states in which hazards are caused among a plurality of instructions;

instruction string generating means for generating an instruction string corresponding to each of the states listed by said hazard state listing means;

first instruction string adding means for adding before the instruction string generated by said instruction string generating means an instruction to initialize an internal state of the processor into a state required to verify an operation of the pipeline control mechanism; and second instruction string adding means for adding after the instruction string generated by said instruction string generating means an instruction to store in specified storage means data required to verify the operation of the pipeline control mechanism.

23. The automatic instruction string generating device according to claim 22, wherein said processor is provided with pipeline stages, each of the pipeline stages completing the pipeline process with a number of clocks different from other pipeline stages.

24. The automatic instruction string generating device according to claim 22, wherein said processor supports an instruction to be processed through a path different from that of other instructions in the pipeline.

25. The automatic instruction string generating device according to claim 22, wherein said processor is provided with a plurality of similar pipeline stages.

26. An automatic instruction string generating device for verifying operations of a pipeline control mechanism of a processor, comprising:

specification information storing means for inputting and storing specification information about a pipeline process of an instruction to be executed by the processor;

hazard state listing means for listing, according to the specification information stored in said specification information storing means, states in which hazards are caused between a last started instruction and an instruction preceding the last started instruction by execution of the last started instruction after the pipeline process has processed a pipeline of the processor without a stop;

instruction string generating means for generating an instruction string corresponding to each of the states listed by said hazard state listing means;

first instruction string adding means for adding before the instruction string generated by said instruction string generating means an instruction to initialize an internal state of the processor into a state required to verify an operation of the pipeline control mechanism; and second instruction string adding means for adding after the instruction string generated by said instruction string generating means an instruction to store in specified storage means data required to verify the operation of the pipeline control mechanism.

27. The automatic instruction string generating device according to claim 26, wherein said processor is provided with pipeline stages, each of the pipeline stages completing the pipeline process with a number of clocks different from other pipeline stages.

28. The automatic instruction string generating device according to claim 26, wherein said processor supports an instruction to be processed through a path different from that of other instructions in the pipeline.

29. The automatic instruction string generating device according to claim 26, wherein said processor is provided with a plurality of similar pipeline stages.

30. An automatic instruction string generating device for verifying operations of a pipeline control mechanism of a processor, comprising:

specification information storing means for inputting and storing specification information about a pipeline process of an instruction to be executed by the processor;

hazard generation instruction string input means for inputting an instruction string in which a hazard is caused among a plurality of instructions when the processor executes the instruction;

instruction execution information obtaining means for obtaining pipeline process information output when the pipeline control mechanism of the processor controls the instruction string in which the hazard is caused and which is input by said hazard generation instruction string input means such that the hazard can be cleared;

hazard state listing means for listing states in which new hazards are caused by executing a new instruction by the processor according to the pipeline process information and the specification information after execution of the instruction string in which the hazard was caused;

instruction string generating means for generating an instruction string corresponding to each of the states listed by said hazard state listing means;

first instruction string adding means for adding before the instruction string generated by said instruction string generating means an instruction to initialize an internal state of the processor into a state required to verify an operation of the pipeline control mechanism; and second instruction string adding means for adding after the instruction string generated by said instruction string generating means an instruction to store in specified storage means data required to verify the operation of the pipeline control mechanism.

31. The automatic instruction string generating device according to claim 30, wherein said processor is provided with pipeline stages, each of the pipeline stages completing the pipeline process with a number of clocks different from other pipeline stages.

32. The automatic instruction string generating device according to claim 30, wherein said processor supports an instruction to be processed through a path different from that of other instructions in the pipeline.

33. The automatic instruction string generating device according to claim 30, wherein said processor is provided with a plurality of similar pipeline stages.

34. A method to generate instruction strings that will cause hazards in a pipeline processor, comprising the steps of:

inputting specification information on the pipeline processor, the specification information including time for the processor to access hardware resources for instructions processed by the processor;

listing hazard states for the hazards achievable with the specification information, the hazard states including information on a series of instructions in time order that causes hazards; and, generating instruction strings corresponding to each hazard state.

35. A device to generate instruction strings that will cause hazards in a pipeline processor, comprising:

a specification information storing device storing specification information on the pipeline processor, the specification information including time for the processor to access hardware resources for instructions processed by the processor;

a hazard state listing device listing hazard states for the hazards achievable with the specification information, the hazard states including information on a series of instructions in time order that causes hazards; and an instruction string generating device generating instruction strings corresponding to each hazard state.

* * * * *